United States Patent
Hötzel et al.

(10) Patent No.: US 10,953,727 B2
(45) Date of Patent: Mar. 23, 2021

(54) AIR-CONDITIONING SYSTEM OF A MOTOR VEHICLE AND METHOD FOR OPERATING THE AIR-CONDITIONING SYSTEM

(71) Applicant: Hanon Systems, Daejeon (KR)

(72) Inventors: Martin Hötzel, Ratingen (DE); Navid Durrani, Kerpen (DE); Christoph Bara, Cologne (DE)

(73) Assignee: HANON SYSTEMS, Daejeon (KR)

(*) Notice: Subject to any disclaimer, the term of this patent is extended or adjusted under 35 U.S.C. 154(b) by 249 days.

(21) Appl. No.: 16/107,015

(22) Filed: Aug. 21, 2018

(65) Prior Publication Data
US 2019/0061471 A1 Feb. 28, 2019

(30) Foreign Application Priority Data

Aug. 23, 2017 (DE) .................. 10 2017 119 289.1
Jul. 26, 2018 (DE) .................. 10 2018 118 118.3

(51) Int. Cl.
*B60H 1/00* (2006.01)
*B60H 1/22* (2006.01)
*B60H 1/32* (2006.01)

(52) U.S. Cl.
CPC .......... *B60H 1/22* (2013.01); *B60H 1/00921* (2013.01); *B60H 1/3211* (2013.01);
(Continued)

(58) Field of Classification Search
CPC ........ B60H 1/00; B60H 1/00021; B60H 1/04; B60H 1/08; B60H 1/10; B60H 1/12;
(Continued)

(56) References Cited

U.S. PATENT DOCUMENTS 5,228,301 A * 7/1993 Sjoholm ............ B60H 1/00007
165/263
2003/0080714 A1* 5/2003 Inoue .................. H01M 10/613
320/150
(Continued)

FOREIGN PATENT DOCUMENTS

DE 102012111672 A1 10/2013
DE 102012108891 A1 3/2014
(Continued)

*Primary Examiner* — Frantz F Jules
*Assistant Examiner* — Erik Mendoza-Wilkenfel
(74) *Attorney, Agent, or Firm* — Shumaker, Loop & Kendrick, LLP; James D. Miller

(57) ABSTRACT

An air conditioning system of a motor vehicle with a refrigeration circuit and with a coolant circuit. The refrigeration circuit includes a compressor, a refrigerant-coolant heat exchanger operable as a condenser/gas cooler for the heat exchange between the refrigerant and the coolant of the coolant circuit, a first expansion device, and a first refrigerant-air heat exchanger for conditioning the intake air for the passenger compartment. The coolant circuit includes a conveying device, a first coolant-air heat exchanger for heating the intake air for the passenger compartment and the refrigerant-coolant heat exchanger. The refrigeration circuit further includes a second refrigerant-air heat exchanger for conditioning the intake air for the passenger compartment with a second expansion device located upstream in flow direction of the refrigerant. The coolant circuit is formed with a second coolant-air heat exchanger for heating the intake air for the passenger compartment.

21 Claims, 10 Drawing Sheets

(52) U.S. Cl.
CPC ......... *B60H 1/32281* (2019.05); *B60H 1/323* (2013.01); *B60H 1/3227* (2013.01); *B60H 2001/00928* (2013.01); *B60H 2001/00942* (2013.01); *B60H 2001/00957* (2013.01); *B60H 2001/2296* (2013.01)

(58) Field of Classification Search
CPC ........... B60H 2001/00121; B60H 2001/00135; B60H 2001/00142; F25B 7/00
See application file for complete search history.

(56) References Cited

U.S. PATENT DOCUMENTS

| | | | |
|---|---|---|---|
| 2010/0064700 A1* | 3/2010 | Ziehr | B60H 1/323 62/84 |
| 2012/0037352 A1 | 2/2012 | Osaka et al. | |
| 2012/0304674 A1* | 12/2012 | Schwarzkopf | B60H 1/32281 62/79 |
| 2016/0018153 A1 | 1/2016 | Ragazzi | |
| 2016/0082805 A1 | 3/2016 | Graaf et al. | |

FOREIGN PATENT DOCUMENTS

| | | |
|---|---|---|
| JP | H10100662 A | 4/1998 |
| JP | 2012081955 A | 4/2012 |

\* cited by examiner

AIR-CONDITIONING SYSTEM OF A MOTOR VEHICLE AND METHOD FOR OPERATING THE AIR-CONDITIONING SYSTEM

CROSS-REFERENCE TO RELATED PATENT APPLICATIONS

This patent application claims the benefit of German Patent Application No. DE 10 2018 118 118.3 filed Jul. 26, 2018 and German Patent Application No. DE 10 2017 119 289.1 filed Aug. 23, 2017, the entire disclosures of which are hereby incorporated herein by reference.

FIELD OF THE INVENTION

The invention relates to an air conditioning system for conditioning the air of a passenger compartment of a motor vehicle, with a refrigeration circuit and a coolant circuit. The refrigeration circuit comprises a compressor, a refrigerant-coolant heat exchanger which can be operated as condenser/gas cooler for the heat exchange between the refrigerant and the coolant of the coolant circuit, as well as a first expansion device and a first refrigerant-air heat exchanger for conditioning the intake air for the passenger compartment. The coolant circuit is formed with a conveying device for circulating the coolant, with a first coolant-air heat exchanger for heating the intake air for the passenger compartment and with the refrigerant-coolant heat exchanger.

The invention moreover relates to a method for operating the air conditioning system.

BACKGROUND OF THE INVENTION

In motor vehicles known from the prior art, the waste heat of the engine is used for heating the intake air for the passenger compartment. The waste heat is transported by means of the coolant circulated in the engine coolant circuit to the air-conditioning system and transferred there via the thermal heat exchanger to the air flowing into the passenger compartment. When the environmental temperatures are low, known systems with coolant-air heat exchangers, which obtain the heat output from the coolant circuit of a highly efficient combustion engine of the vehicle drive, no longer reach the level required for comfortable heating of the passenger compartment in order to cover the total heat demand of the passenger compartment. The drives do not generate sufficient waste heat to heat the passenger compartment in a manner appropriate for the requirements of thermal comfort, in particular in winter. The situation is similar for systems in motor vehicles with hybrid drive, that is to say motor vehicles having both an electric motor drive and also a combustion engine drive.

If the total heat demand of the passenger compartment cannot be covered by means of the heat from the engine cooling circuit, additional heating measures are necessary such as electrical resistance heaters, referred to abbreviated as PTC resistor in accordance with the English "positive temperature coefficient thermistor," or fuel heaters. The same applies to systems in motor vehicles driven only by an electric motor or in fuel cell vehicles.

In FIG. 1, an air conditioning system 1' with a refrigeration circuit 2' and a coolant circuit 30' from the prior art can be seen. The refrigeration circuit 2' has, in the flow direction of the refrigerant, a compressor 3, a refrigerant-coolant heat exchanger 4 operated as condenser/gas cooler, an expansion device 5 as well as a refrigerant-air heat exchanger 6 operated as evaporator. The compressor 3 suctions the refrigerant from the evaporator 6. The refrigeration circuit 2' is closed.

If the refrigerant is liquefied during subcritical operation of the refrigeration circuit, for example, with the refrigerant R134a or under certain environmental conditions with carbon dioxide, the heat exchanger is referred to as condenser. Some of the heat transfer occurs at constant temperature. During supercritical operation or in the case of supercritical heat release in the heat exchanger, the temperature of the refrigerant decreases continuously. In this case, the heat exchanger is also referred to as gas cooler. Supercritical operation can occur under certain environmental conditions or modes of operation of the refrigeration circuit, for example, with the refrigerant carbon dioxide.

The refrigeration circuit 2' can also be formed with an inner heat exchanger 7. The inner heat exchanger 7 is understood to be a circuit-internal heat exchanger which is used for the heat transfer between the refrigerant at high pressure and the refrigerant at low pressure. Here, for example, the liquid refrigerant is further cooled after the condensation, on the one hand, and, the suction gas is overheated before the compressor 3, on the other hand.

The coolant circuit 30' comprises, in flow direction of the coolant, a conveying device 31 for circulating the coolant, in particular a pump, an add-on thermal heat exchanger 32 for heating the coolant, especially an electric resistance heater (PTC), and a thermal heat exchanger 33 as first coolant-air heat exchanger for heating the intake air for the passenger compartment. The thermal heat exchanger 33 is connected to the refrigerant-coolant heat exchanger 4. The coolant circuit 30' is closed. The refrigerant-side refrigerant-coolant heat exchanger 4 which is operated as condenser/gas cooler is consequently cooled by coolant.

The refrigerant-air heat exchanger 6 of the refrigeration circuit 2', which is operated as evaporator, and the thermal heat exchanger 33 of the coolant circuit 30' are arranged within a component 60 of an air conditioning unit and arranged in a manner so that they can be supplied one after the other in flow direction 61 with the intake air of the passenger compartment. Thereby, the intake air which is cooled and/or dehumidified as it flows over the evaporator 6 can be heated as needed when it flows over the thermal heat exchanger 33.

Heat which can be transferred in the thermal heat exchanger 33 to the intake air of the passenger compartment can be composed of the energies which are transferred in the evaporator 6 and in the compressor 3 to the refrigerant and transferred additively in the refrigerant-coolant heat exchanger 4 to the coolant, as well as of the heat transferred in the add-on thermal heat exchanger 32 to the coolant, in order to reach a sufficient temperature of the intake air.

In conventional air conditioning systems, not represented, with a refrigeration circuit with a condenser/gas cooler formed as refrigerant-air heat exchanger, the heat which is absorbed by the refrigerant in the evaporator during the operation in the refrigeration mode during the cooling and dehumidification of the intake air for the passenger compartment is transferred together with the heat supplied in the compressor via the refrigerant-air heat exchanger arranged in the front area of the motor vehicle from the refrigerant to the environmental air.

The air conditioning system 1' can only be operated at temperatures of the intake air flowing into the evaporator 6 having values above 0° C. At values of the temperature of the air below 0° C., the heat output is determined by the add-on thermal heat exchanger 32, in particular the electrical resistance heater, and is thus provided inefficiently. At air temperatures of about 0° C. and lower than 0° C., the heat exchange surface of the evaporator 6 can ice up. As a consequence of the uptake of the heat from the air, the relative air humidity of the cooled air increases. When the dew point temperature is not reached, the water vapor present in the air is condensed out and deposits as water on the heat exchange surface. The water condensed out of the air on the heat exchange surface will solidify to form ice at surface temperatures of about 0° C. and lower than 0° C. The increasing ice layer decreases the air-side heat exchange surface and the air-side heat exchange and thus the heat exchange between the air and the evaporating refrigerant.

Heat uptake from the environment, for example, during operation in the heat pump mode, is not possible. The heat from air flowing out of the passenger compartment can also not be used.

For motor vehicles with autonomous vehicle control, also referred to as autonomous vehicles, the comfort need moreover shifts from the front seat to seats in additional possible rows of seats, which considerably increases the comfort demand of the passenger seats. An additional heat exchanger, operated as evaporator, which is integrated in the air conditioning unit for increased comfort in the passenger compartment and which is also referred to as rear evaporator, is conventionally operated for system-related reasons at the same pressure level and thus at the same temperature level as the front evaporator or main evaporator and, in the case of a low blower output and simultaneously a high output of the front evaporator, it can ice up easily.

In addition, the rear evaporator, particularly when operated at high outside temperatures, usually suctions air from the passenger compartment, possibly resulting in a considerable output difference between the front evaporator which suctions fresh air from the environment and the rear evaporator which suctions recirculated air from the passenger compartment, which in turn considerably increases the risk of icing up. In order to prevent the icing up of the heat exchange surfaces, the output of the compressor is usually reduced, which lowers the overall refrigerating capacity of the system.

A more efficient possibility of heating the air for the passenger compartment is a heat pump with air as heat source, wherein the refrigeration circuit is used both as sole heater and also as auxiliary heating measure.

On the one hand, an air conditioning system with downstream electrical resistance heater can be produced cost effectively and be used in any motor vehicles, but, on the other hand, it has a very high demand for electrical energy, since the intake air for the passenger compartment is first cooled and/or dehumidified as it flows over an evaporator of a refrigeration circuit is subsequently heated by means of the electrical resistance heater which transfers the heat directly to the intake air or to a coolant circuit.

Although the operation of a conventional air conditioning system to be operated as heat pump is efficient, it requires a very large installation space, including in positions within the motor vehicle where no installation space is reserved for the air conditioning. The increased expense, in particular for the production and maintenance, and also the large installation space requirement are obstacles.

Air-air heat pumps of the prior art, which are designed for the combined refrigeration mode and heat pump mode, that is to say for a heating mode, as well as for a reheating mode also referred to as "reheat" operation, absorb the heat from the environmental air. Consequently, the environmental air is used as heat source for the evaporation of the refrigerant.

The conventional air-air heat pumps comprise a heat exchanger for the heat exchange between the refrigerant and the environment, a heat exchanger for the heat supply from the air to be conditioned of the passenger compartment to the refrigerant, and a heat exchanger for the heat transfer from the refrigerant to the air to be conditioned for the passenger compartment. The outputs are transferred in each case between the refrigerant and air.

In the so-called "reheat" or reheating mode, the air to be supplied to the passenger compartment is cooled, dehumidified in the process, and subsequently heated again slightly. In this operating mode, the post-heating output required is lower than the refrigerating capacity required for the cooling and dehumidification of the air.

The heat exchanger for the heat transfer between the refrigerant and the environmental air of the air-air heating pump is here arranged outside of the housing of the air conditioning system, especially outside of the air conditioning unit, on the front side of the motor vehicle, and it is supplied with air in particular due to the headwind. The heat exchanger arranged outside of the housing of the air conditioning unit is also referred to as environmental heat exchanger.

During the operation of the refrigeration circuit in the refrigeration mode, the environmental heat exchanger is operated as condenser/gas cooler for the heat release from the refrigerant to the environmental air, and during the operation of the refrigeration circuit in the heat pump mode, it is operated as evaporator for the heat absorption by the refrigerant from the environmental air. The environmental heat exchanger is thus designed for operation in both functions, but, as a result, the design is optimal for neither of the two functions.

From DE 10 2012 111 672 A1, a refrigeration circuit of an air conditioning system for conditioning the air of a passenger compartment of a motor vehicle is known. The refrigeration circuit is designed for a combined operation in the refrigeration mode and heat pump mode as well as for a reheating mode, and it comprises a compressor, a heat exchanger for the heat exchange between the refrigerant and the environment, a first expansion device as well as a heat exchanger for heat supply from the air to be conditioned of the passenger compartment to the refrigerant, a heat exchanger for the heat transfer from the refrigerant to the air to be conditioned for the passenger compartment, and a second expansion device adjoining it in flow direction of the refrigerant.

The refrigeration circuit has a branched system consisting of connection lines which are difficult to integrate in the existing installation space. Moreover, the additional valves and the refrigerant reservoir designed to be of large volume and set at a low-pressure level in each case require a large installation space. In addition, the valves have to have a very tight internal sealing, which also leads to increased system costs.

The use of the waste heat from the passenger compartment is very limited. In addition, refrigerant flows through heat exchangers bidirectionally, the compressor has to be turned off when switching between the different operating modes, and the valves have to be switched. The air conditioning system cannot use waste heat of the passenger compartment for the heating of the passenger compartment. The hot air of the passenger compartment is discharged into the environment.

In DE 10 2012 108 891 A1, an air conditioning system for conditioning the air of a passenger compartment is described, which comprises a housing with two flow channels for the running of air as well as a refrigeration circuit with an evaporator and a condenser. Here, the evaporator is arranged in the first flow channel, and the condenser is arranged in the second flow channel. The air conditioning system is designed for cooling and for heating the passenger compartment as well as for a reheating operation.

The setting of the operating mode consequently occurs only via the control of air guide devices, so that that refrigerant switch valves for switching between different operating modes can be dispensed with.

Independently of the respective operating mode, in each case a blower for the evaporator side and for the condenser side of the air conditioning system and thus two separately operated blowers have to be provided. Here, for example, during the operation in the refrigeration mode, the energy of the headwind cannot be used for the heat release on the condenser side. The associated blower is always in the operating state, which can lead to vibrations and noise. In addition, installation space needs to be reserved in positions within the motor vehicle which have no installation space reserved for the air conditioning.

Although the air conditioning system can use waste heat of the passenger compartment for the heating of the passenger compartment, reconfiguration of the flow paths for the intake air and the extracted air of the passenger compartment in the existing motor vehicles is very complicated.

If, for the air conditioning systems known from DE 10 2012 111 672 A1 or DE 10 2012 108 891 A1, waste heat, for example, from a coolant circuit, is also to be usable simultaneously, then, in each case, an additional heat exchanger which can be operated as an evaporator for the refrigerant, in particular a plate evaporator, has to be provided additionally with an additional expansion device, in particular an expansion valve. However, here, during the operation in the refrigeration mode, both the refrigerant-air heat exchanger operated as evaporator and also that the additional plate evaporator of the coolant circuit are supplied with refrigerant at the same pressure level. The two different energy flows of the air and of the coolant would have to be at the same temperature level in order to be able to efficiently operate the refrigeration circuit. However, since the temperature of the air in the passenger compartment is heated only slowly, the operation of the evaporator at the same pressure level is conceivable only in rare cases and only for a short duration. It is only during the operation of the refrigeration circuit in the heat pump mode that the different refrigerant-air heat exchangers and plate heat exchangers could be operated at the same pressure level.

SUMMARY OF THE INVENTION

The aim of the invention now consists in providing an air conditioning system for a motor vehicle which can be operated both in the refrigeration mode, in the heat pump mode and also that in the reheating mode. Here, it should be possible to efficiently couple waste heat of different heat sources, for example, waste heat of the passenger compartment, at corresponding temperature levels, into the refrigeration circuit, in particular during operation in the heat pump mode or in the reheating mode. Moreover, outputs of heat exchangers operated as evaporators should be variably adjustable in order to avoid a possible icing up of the heat exchange surfaces independently of the respective operating mode. The air conditioning system thus should enable efficient operation, in particular at minimal risk of icing up of the evaporators of the refrigeration circuit for the heat exchange with air and should have a compact design. The refrigeration circuit of the air conditioning system should here be built in a structurally simple manner and have a minimal necessary number of components, so as to bring about only minimal operating costs, production costs and maintenance costs, and it should have a minimal installation space requirement.

An additional aim of the invention consists in providing a method for operating the air conditioning system, by means of which several heat exchangers can be operated efficiently in each case at corresponding temperature levels.

The aim is achieved by the subject matter and respectively by the method having the features as shown and described herein.

The aim is achieved by an inventive air conditioning system for conditioning the air of a passenger compartment of a motor vehicle, in particular for operation in a refrigeration mode, in a heat pump mode and in a reheating mode, with a refrigeration circuit and a coolant circuit. The refrigeration circuit comprises in flow direction of the refrigerant a compressor, a refrigerant-coolant heat exchanger which can be operated as condenser/gas cooler for the heat exchange between the refrigerant and the coolant of the coolant circuit, a first expansion device, and a first refrigerant-air heat exchanger for conditioning the intake air for the passenger compartment. The coolant circuit is designed with a conveying device for circulating the coolant, with a first coolant-air heat exchanger for heating the intake air for the passenger compartment, and with the refrigerant-coolant heat exchanger.

The refrigeration mode is used primarily for cooling, the heat pump mode for heating, and the reheating mode for post-heating of the intake air to be conditioned of the passenger compartment. In the reheating mode, the intake air has been cooled and/or dehumidified before the post-heating.

According to the concept of the invention, the refrigeration circuit is formed with a second refrigerant-air heat exchanger for conditioning the intake air for the passenger compartment, wherein a second expansion device is located upstream of the second refrigerant-air heat exchanger in flow direction of the refrigerant. The coolant circuit is formed with a second coolant-air heat exchanger for heating the intake air for the passenger compartment.

The first refrigerant-air heat exchanger of the refrigeration circuit and the first coolant-air heat exchanger of the coolant circuit are advantageously arranged within a first component of an air conditioning unit and in a manner so that they can be supplied with air in the indicated order one after the other in flow direction of the intake air for the passenger compartment. The first component of the air conditioning unit moreover preferably comprises an air guide device for distributing and guiding partial air mass streams over a heat exchange surface of the first coolant-air heat exchanger or around the first coolant-air heat exchanger.

The second refrigerant-air heat exchanger of the refrigeration circuit and the second coolant-air heat exchanger of the coolant circuit are moreover advantageously arranged within a second component of the air conditioning unit.

According to a development of the invention, the first component of the air conditioning unit, which is arranged in particular in a front area of the motor vehicle or of the passenger compartment, is designed so as to enable through-flow of air discharged from the passenger compartment or of environmental air or of a mixture of air discharged from the passenger compartment and environmental air.

The second component of the air conditioning unit, which is arranged in particular in a middle or rear area of the passenger compartment, is advantageously designed so as to enable throughflow of air discharged from the passenger compartment, wherein the air can be diverted into the passenger compartment and/or into the environment. Thereby, waste heat from the extracted air of the passenger compartment can be used, for example, during operation of the first component of the air conditioning unit in the fresh air mode, that is to say during operation with suctioned environmental air, or in the circulation mode, that is to say during operation with air discharged from the passenger compartment.

In addition, independent operation of the two components of the air conditioning unit is always possible, so that that the air conditioning system can also that be operated only with the second component, while the first component of the air conditioning unit is not in operation.

According to a first alternative design of the invention, the second refrigerant-air heat exchanger of the refrigeration circuit and the second coolant-air heat exchanger of the coolant circuit are arranged within the second component of the air conditioning unit in a manner so that they can be supplied one after the other in flow direction of the air. The second component of the air conditioning unit in addition comprises a bypass for guiding air around the refrigerant-air heat exchanger. Here, the second component of the air conditioning unit is formed with an air guide device for distributing and guiding an air mass stream over a heat exchange surface of the second refrigerant-air heat exchanger and through the bypass around the second refrigerant-air heat exchanger.

According to a second alternative design of the invention, the second component of the air conditioning unit is formed from two elements arranged separately from one another. Here, the second coolant-air heat exchanger of the coolant circuit is arranged within the first element of the second component of the air conditioning unit, and the second refrigerant-air heat exchanger of the refrigeration circuit is arranged within the second element of the second component of the air conditioning unit. The separately arranged elements of the second component of the air conditioning unit preferably in each case comprise a blower and thus blowers that can be operated separately for the independent conveying of separate air mass streams through the elements.

The second component of the air conditioning unit moreover advantageously comprises an opening formed within a wall of a housing, for discharging air into the environment, and a second air guide device for opening and closing the opening. Here, the opening is located downstream in flow direction of the air with respect to the second refrigerant-air heat exchanger, in the first alternative design of the second component of the air conditioning unit in particular between the second refrigerant-air heat exchanger and the second coolant-air heat exchanger.

According to a development of the invention, the first expansion device and the first refrigerant-air heat exchanger are arranged within a first flow path of the refrigeration circuit, while the second expansion device and the second refrigerant-air heat exchanger are arranged within a second flow path of the refrigeration circuit. Thus, refrigerant can flow through the flow paths parallel to one another. The refrigeration circuit in addition advantageously comprises a third flow path with a second expansion device and a heat exchanger which can be operated as evaporator. The third expansion device is located upstream with respect to the heat exchanger in flow direction of the refrigerant. Here, the third flow path is designed parallel to the first flow path and the second flow path. The heat exchanger which can be operated as evaporator is advantageously designed as refrigerant-coolant heat exchanger.

The first flow path with the first expansion device and with the first refrigerant-air heat exchanger and the second flow path with the second expansion device and with the second refrigerant-air heat exchanger are advantageously in each case designed so that that they extend from a branching point to a first opening point.

The third flow path with the third expansion device and with the heat exchanger is preferably designed so that it extends from a branching point to a second opening point. Here, the second opening point is located downstream with respect to the first opening point in flow direction of the refrigerant through the first flow path and through the second flow path.

According to a first alternative design of the invention, an expansion device is located downstream with respect to the first opening point in flow direction of the refrigerant, wherein the expansion device is preferably arranged between the first opening point and the second opening point.

According to a second alternative design of the invention, in each case an expansion device is located downstream with respect to the first refrigerant-air heat exchanger within the first flow path and downstream with respect the second refrigerant-air heat exchanger within the second flow path in flow direction of the refrigerant.

In addition, the refrigeration circuit preferably comprises an inner heat exchanger.

According to a first alternative design of the invention, the inner heat exchanger is arranged on the high-pressure side between the refrigerant-coolant heat exchanger which can be operated as condenser/gas cooler for the heat exchange between the refrigerant and the coolant of the coolant circuit, and the branching point of the first flow path and of the second flow path, and on the low-pressure side either between the second opening point of the third flow path and the compressor or between the first opening point of the first flow path and of the second flow point and the second opening point of the third flow path.

According to a second alternative design of the invention, the inner heat exchanger is arranged within the first flow path. Here, the inner heat exchanger is arranged in flow direction of the refrigerant on the high-pressure side before the first expansion device and on the low-pressure device after the first refrigerant-air heat exchanger.

Another advantage of the invention consists in that the first coolant-air heat exchanger is arranged within a first flow path of the coolant circuit, and the second coolant-air heat exchanger is arranged within a second flow path of the coolant circuit, wherein the flow paths and thus the coolant-air heat exchangers are arranged so as to allow throughflow of refrigerant parallel to one another.

According to an alternative design of the invention, the first coolant-air heat exchanger and the second coolant-air heat exchanger are arranged within a common flow path of the coolant circuit, so that that the coolant-air heat exchangers enable coolant to flow through them in series one after the other.

According to a development of the invention, the coolant circuit in addition is formed with a third coolant-air heat exchanger for the transfer of heat to air, in particular to environmental air.

The third coolant-air heat exchanger is advantageously arranged within a flow path of the coolant circuit which enables throughflow of coolant parallel to the flow path formed with the first coolant-air heat exchanger and/or the second coolant-air heat exchanger.

The coolant circuit moreover preferably comprises a flow path formed as bypass parallel to the flow paths of the coolant-air heat exchangers.

In addition, the coolant circuit is advantageously provided with a flow path which is arranged parallel to the flow paths formed with the coolant-air heat exchangers and/or to the flow path formed as bypass, and moreover it comprises a heat exchanger which can be operated as evaporator, and a second conveying device. The heat exchanger which can be operated as evaporator is advantageously designed as refrigerant-coolant heat exchanger.

The flow path formed parallel to the flow paths with the coolant-air heat exchangers and/or the bypass preferably comprises an additional heat exchanger for the cooling of components of a power train, such as a battery or an engine, or electrical components. Thereby, the waste heat of different heat sources becomes usable in the coolant circuit.

The aim of the invention is also achieved by an inventive method for operating an air conditioning system of a motor vehicle with a refrigeration circuit and with a coolant circuit for operation in a refrigeration mode, in a heat pump mode, and in a reheating mode for the intake air to be conditioned of the passenger compartment.

According to the concept of the invention, the pressure levels of the refrigerant are adjusted in such a manner that the pressure level within a first refrigerant-air heat exchanger for conditioning the intake air for the passenger compartment and the pressure level within a second refrigerant-air heat exchanger for conditioning the intake air for the passenger compartment correspond to one another or differ from one another. Here, according to the invention, moreover, at least one pressure level within the first refrigerant-air heat exchanger and/or within the second refrigerant-air heat exchanger corresponds to the pressure level within an additional heat exchanger which can be operated as evaporator or is higher than the pressure level within the heat exchanger which can be operated as evaporator.

According to a development of the invention, the refrigerant flows through the first refrigerant-air heat exchanger and the second refrigerant-air heat exchanger of the refrigeration circuit parallel to one another. The additional heat exchanger which can be operated as an evaporator is again advantageously supplied with refrigerant parallel to the first refrigerant-air heat exchanger and/or the second refrigerant-air heat exchanger.

According to a preferred design of the invention, the coolant flows through a first coolant-air heat exchanger and a second coolant-air heat exchanger of the coolant circuit parallel to one another or in series one after the other.

In a flow direction of the air, within a first component of an air conditioning unit, preferably the first refrigerant-air heat exchanger and subsequently the first coolant-air heat exchanger are supplied with air, wherein at least one partial air mass stream is run over a heat exchange surface of the first coolant-air heat exchanger.

In addition, in a flow direction of the air, within a second component of the air conditioning unit, the second refrigerant-air heat exchanger and subsequently the second coolant-air heat exchanger are supplied with air, wherein in each case at least one partial air mass stream is run over a heat exchange surface of the second refrigerant-air heat exchanger and over a heat exchange surface of the second coolant-air heat exchanger, and/or at least one partial air mass stream of an air mass stream run over a heat exchange surface of the second refrigerant-air heat exchanger or past the second refrigerant-air heat exchanger is diverted into the environment.

The inventive air conditioning system and respectively the method for operating the air conditioning system have various advantages in summary:

air conditioning, in particular cooling, dehumidification and/or heating of the intake air of the passenger compartment with minimal energy use, including by using all the waste heat and leakage heat streams for the heating of the passenger compartment at different temperature levels without output limitation, minimal risk of icing up of the heat exchange surface, increased performance capacity, efficiency and useful life even in permanent operation without abrupt changes in load, as well as provision of sufficient and increased comfort within the passenger compartment with locally highly reduced air speeds with a structurally simple refrigeration circuit consisting of standard components without modifications, which circuit can be integrated for use in known schemes and existing installation spaces of existing motor vehicles, and which has a minimal installation space, a minimal weight as well as a minimal number of components, resulting in minimal operating costs, production costs and maintenance costs.

DESCRIPTION OF THE DRAWINGS

Additional details, features and advantages of designs of the invention result from the following description of embodiment examples in reference to the associated drawings. The drawings show.

DETAILED DESCRIPTION OF THE INVENTION

Figure 1:
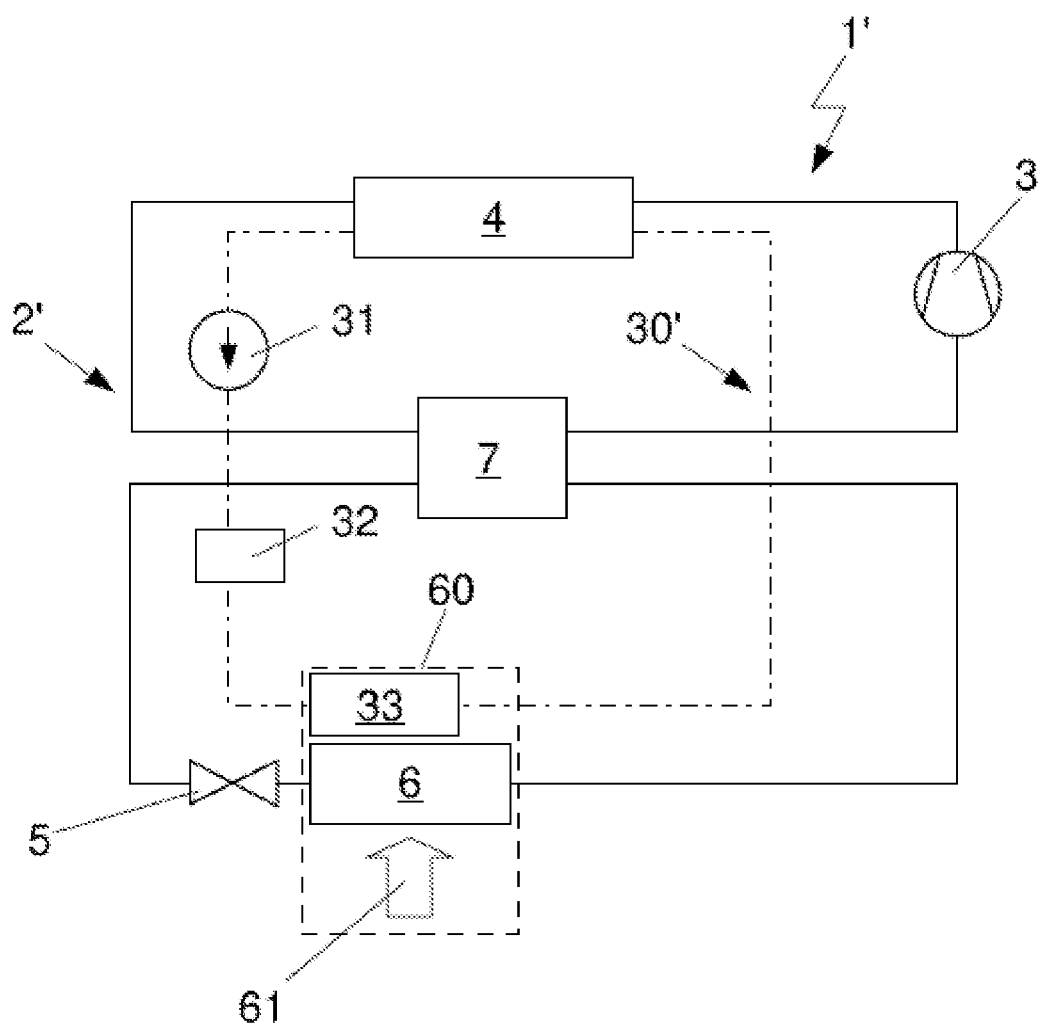
FIG. 1: an air conditioning system with a refrigeration circuit and a coolant circuit according to the prior art.
Figure 2:
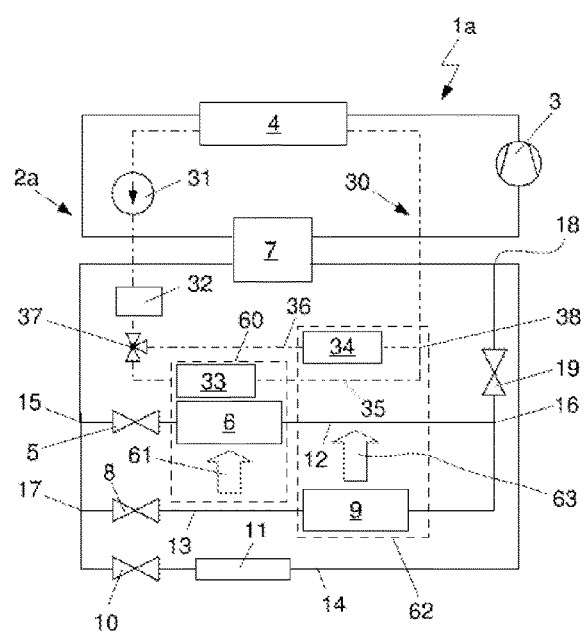
FIGS. 2 and 3: in each case an air conditioning system with a refrigeration circuit comprising a first and a second refrigerant-air heat exchanger, with a coolant circuit comprising a first and a second coolant-air heat exchanger, and with a refrigerant-coolant heat exchanger which thermally connects the refrigeration circuit and the coolant circuit.

In FIG. 2 an air conditioning system 1a is represented, with a refrigeration circuit 2a and a coolant circuit 30. The refrigeration circuit 2a comprises in flow direction of the refrigerant a compressor 3, a refrigerant-coolant heat exchanger 4 operated as condenser/gas cooler, a first expansion device 5, and a first refrigerant-air heat exchanger 6 for conditioning the intake air for the passenger compartment.

In addition, the refrigeration circuit 2a is formed with a second refrigerant-air heat exchanger 9 for conditioning the intake air for the passenger compartment, with respect to which a second expansion device 8 is located upstream in flow direction of the refrigerant. The first refrigerant-air heat exchanger 6 and the second refrigerant-air heat exchanger 9 are arranged so that they can be supplied with refrigerant parallel to one another. The first refrigerant-air heat exchanger 6 and the associated second expansion device 8 are formed within a first flow path 12 which extends from a first branching point 15 to a first opening point 16, while the second refrigerant-air heat exchanger 9 and the associated second expansion device 8 are formed within a second flow path 13 which extends from a second branching point 17 to the first opening point 16.

In addition to the first flow path 12 and the second flow path 13, the refrigeration circuit 2a comprises additionally a third flow path 14 which extends from the second branching point 17 to a second opening point 18. The third flow path 14, which is designed parallel to the first flow path 12 and to the second flow path 13, especially to the refrigerant-air heat exchangers 6, 9, comprises a heat exchanger 11 designed, for example, as a refrigerant-coolant heat exchanger and which can be operated as an evaporator, and with respect to which a third expansion device 10 is located upstream in flow direction of the refrigerant. In the case of the design as a refrigerant-coolant heat exchanger, the heat exchanger 11 could be provided for temperature control of a coolant which circulates in a coolant circuit for conditioning components of the drive train, such as a battery or an engine, or electrical components. The heat exchanger 11 which is advantageously designed as a plate heat exchanger is thus used for absorbing additional waste heat that is available.

Between the first opening point 16 of the first flow path 12 and of the second flow path 13 and the second opening point 18 of the third flow path 14, a fourth expansion device 19 is arranged. The expansion devices 5, 8, 10, 19 are in each case preferably designed as expansion valves.

The refrigeration circuit 2a moreover comprises an inner heat exchanger 7 which is formed on the high-pressure side between the refrigerant-coolant heat exchanger 4 and the first branching point 15 and on the low-pressure side between the second opening point 18 and the compressor 3. The inner heat exchanger 7 is used here for the heat exchange between the refrigerant at high pressure and the refrigerant at low pressure, wherein, on the one hand, the liquid refrigerant flowing out of the heat exchanger 4 operated as a condenser/gas cooler is cooled further, and, on the other hand, the refrigerant exiting the heat exchangers 6, 9, 11 which can be operated as evaporators, as suction gas, is superheated by the compressor 3. In addition to the protection of the compressor 3 against fluid hammer, by means of the operation of the refrigeration circuit 2a with inner heat exchanger 7, in comparison to the operation without the inner heat exchanger 7, the specific compressor output can be reduced and at the same time the specific cold output and thus the efficiency of the operation of the air conditioning system 1a can be increased.

A collector, not represented, arranged in flow direction of the refrigerant before the compressor 3 and thus on the low-pressure side, which is also referred to as accumulator, is used for the deposition and the collection of a refrigerant fluid. The compressor 3 suctions gaseous refrigerant from the collector.

According to an alternative embodiment, not represented, the collector is integrated as a refrigerant reservoir within the refrigerant-coolant heat exchanger 4 and thus arranged at the high-pressure level of the refrigerant. Here, the collector arranged on the low-pressure level can be dispensed with. The refrigerant-coolant heat exchanger 4 can in addition be designed with a device for drying the refrigerant.

The refrigerant-coolant heat exchanger 4 is used for the thermal connection of the refrigeration circuit 2a with the coolant circuit 30. Here, the heat is transferred from the refrigerant to the coolant.

The coolant circuit 30 comprises in flow direction of the coolant a conveying device 31 for circulating the coolant, in particular a pump, as well as a first thermal heat exchanger 33 as first coolant-air heat exchanger for heating the intake air for the passenger compartment. The first thermal heat exchanger 33 is connected within the coolant circuit 30 in addition to the refrigerant-coolant heat exchanger 4. The refrigerant-coolant heat exchanger 4 operated on the refrigerant side as a condenser/gas cooler is consequently cooled by coolant.

The coolant circuit 30 moreover comprises a second thermal heat exchanger 34 designed as a coolant-air heat exchanger for heating the intake air for the passenger compartment. The first coolant-air heat exchanger 33 and the second coolant-air heat exchanger 34 are arranged so they can be supplied with coolant parallel to one another. The first coolant-air heat exchanger 33 is here formed within a first flow path 35, while the second coolant-air heat exchanger 34 is formed within a second flow path 36, wherein the flow paths 35, 36 in each case extend from a branching point 37 to an opening point 38. The branching point 37 is advantageously designed as a three-way valve.

In addition, the coolant circuit 30 comprises an add-on thermal heat exchanger 32, arranged between the conveying device 31 and the branching point 37, as an additional heat source for heating the coolant. The heat transferred in the heat exchanger 32 to the coolant is available, for example, for the heat transfer to the intake air for the passenger compartment.

Since the air conditioning system 1a can be used advantageously in motor vehicles with hybrid drive, in particular in motor vehicles with a battery which can be charged both via a combustion engine and also by the power grid, so-called plug-in hybrid vehicles, or it can be used for motor vehicles with conventional combustion engine, the add-on thermal heat exchanger 32 can also be used for cooling the combustion engine or the battery or electrical components. The add-on thermal heat exchanger 32 can in addition also be designed as an electrical resistance heater (PTC).

The refrigerant-air heat exchanger 6 of the refrigeration circuit 2a and the first thermal heat exchanger 33 of the coolant circuit 30 are arranged within an air conditioning unit, in particular within a first component 60 of the air conditioning unit, so that they can be supplied in the indicated order one after the other in flow direction 61 of the intake air of the passenger compartment. Thus, the intake air for the passenger compartment, which is cooled and/or dehumidified as it flows over the first refrigerant-air heat exchanger 6 operated as an evaporator, can be heated as needed as it flows over the first thermal heat exchanger 33. The supplying of the first thermal heat exchanger 33 with a flow of air conditioned beforehand as it flows over the first refrigerant-air heat exchanger 6 can be controlled by means of a temperature flap which is not represented.

Here, air discharged from the passenger compartment, environmental air as fresh air, or a mixture of air discharged from the passenger compartment and environmental air can flow through the first component 60 of the air conditioning unit, which is arranged in the front area of the motor vehicle. The intake air conditioned as it flows through the first component 60 of the air conditioning unit, which is arranged in the front area of the motor vehicle, is preferably introduced in the area of the front seats into the passenger compartment.

The second refrigerant-air heat exchanger 9 of the refrigeration circuit 2a and the second coolant-air heat exchanger 34 of the coolant circuit 30 are arranged within the air conditioning unit, in particular within a second component 62 of the air conditioning unit, so that they can be supplied one after the other in the order indicated in flow direction 63 of the intake air of the passenger compartment. Thus, the intake air for the passenger compartment, which has been cooled and/or dehumidified as it flows over the second refrigerant-air heat exchanger 9 operated as an evaporator, can be heated as needed as it flows over the second thermal heat exchanger 34. The supplying of the second thermal heat exchanger 34 with air conditioned beforehand as it flows over the second refrigerant-air heat exchanger 9 can be controlled by means of a temperature flap which is not represented.

Here, in particular air discharged from the passenger compartment can flow through the second component 62 of the air conditioning unit, which is arranged, for example, in the middle or rear area of the motor vehicle. The air conditioned as it flows through the second component 62 of the air conditioning unit is introduced as intake air for the passenger compartment preferably in the area of additional seats or seat rows other than the front seats into the passenger compartment or is discharged into the environment. The air mass stream which has been conditioned thus can also be divided into partial air mass streams, wherein a first partial air mass stream is introduced into the passenger compartment and a second partial air mass stream is discharged into the environment. The mass streams can be divided in a proportion of between 0 and 100%.

In particular during operation with recirculated air, that is to say with air discharged from the passenger compartment, the air conditioning system 1a can also be operated at outside air temperatures having values of less than 0° C., without a risk of icing up of the heat exchange surface of the refrigerant-air heat exchangers 6, 9 operated as evaporators.

In order to ensure this operation, the first refrigerant-air heat exchanger 6 arranged in the first component 60 of the air conditioning unit, or the second refrigerant-air heat exchanger 9 arranged in the second component 62 of the air conditioning unit, can be supplied as needed with refrigerant at a medium pressure level and operated as an evaporator. The latent heat to be discharged from the air during the dehumidification of the air entering the evaporators 6, 9 is used here together with the output supplied to the refrigerant during the compression in the compressor 3, in each case in order to heat the intake air for the passenger compartment to a desired discharge temperature. The heat absorbed by the refrigerant is transferred in the coolant-cooled refrigerant-coolant heat exchanger 4 to the coolant which releases the heat absorbed during the flow through the thermal heat exchangers 33, 34 to the intake air for the passenger compartment. The pressure of the refrigerant, after flowing out of the refrigerant-air heat exchangers 6, 9 as it flows through the expansion device 19, is reduced to a low pressure level at which the heat exchanger 11 is also operated.

During the operation of the air conditioning system 1a in the heat pump mode or in the reheating mode, heat which can be transferred in the thermal heat exchangers 33, 34 to the intake air of the passenger compartment can be composed of the energies transferred to the refrigerant in the first refrigerant-air heat exchanger 6 operated as an evaporator or in the second refrigerant-air heat exchanger 9 operated as an evaporator and in the compressor 3, energies which are transferred additively in the refrigerant-coolant heat exchanger 4 to the coolant, in order to reach a sufficient temperature of the intake air for the passenger compartment.

This means that, if the heat provided in the refrigeration circuit 2a for heating the intake air of the passenger compartment during operation in the heat pump mode or in the reheating mode is not sufficient and additional heat absorption is necessary, the heat exchanger 11 operated as refrigerant-coolant heat exchanger can be used as needed as additional heat source, wherein the third expansion device 10 is opened and the refrigerant evaporates as it flows through the heat exchanger 11 with absorption of heat.

During the operation of the air conditioning system 1a in the heat pump mode, the expansion devices 5, 8, which are located upstream of the refrigerant-air heat exchangers 6, 9 operated as condenser/gas cooler, can be opened or regulated so as to allow the passage of the refrigerant without pressure loss or so as to reduce the pressure of the refrigerant to a medium pressure level. The refrigerant-air heat exchangers 6, 9 operated here as condenser/gas cooler are supplied with refrigerant at a high-pressure level or a medium-pressure level and if needed can preheat the intake air for the passenger compartment flowing into the components 60, 62 of the air conditioning unit. Subsequently, the pressure of the refrigerant is reduced as it flows through the expansion device 19 to a low-pressure level at which the heat exchanger 11 is also operated. The intake air is heated further as it flows over the coolant-supplied thermal heat exchangers 33, 34.

Here it must be ensured that the refrigerant, as suction gas, is sufficiently superheated before the compressor 3, for example, by mixing with a partial mass stream run through the third flow path 14 or as it flows through the inner heat exchanger 7, in order to ensure the reliable operation of the compressor 3.

The coolant is circulated independently of the operating mode and heated as it flows through the refrigerant-coolant heat exchanger 4.

The design of the expansion devices 5, 8 located upstream with respect to the refrigerant-air heat exchangers 6, 9 in flow direction of the refrigerant and the design of the expansion device 19 located downstream with respect to the refrigerant-air heat exchangers 6, 9 enable the operation of the refrigeration circuit 2a at different pressure levels, in particular within the refrigerant-air heat exchangers 6, 9 in comparison to the heat exchanger 11 as heat source. Here, the refrigerant can flow through the refrigerant-air heat exchangers 6, 9 at the same pressure level, such as at a high-pressure level, a medium-pressure level and a low-pressure level, while the heat exchanger 11 is supplied with refrigerant at low-pressure level. The respective pressure level is set by means of the expansion devices 5, 8, 19 designed as expansion valves, wherein the expansion devices 5, 8, 19 can be continuously adjusted between the positions "fully opened" and "closed."

The switch between the different operating modes can occur under continuous operation of the compressor 3; an interruption of the operation of the compressor 3 is not necessary. Thus, the operation of the refrigeration circuit 2*a* continuously and without negative impact on the vehicle occupants is possible.

Figure 3:
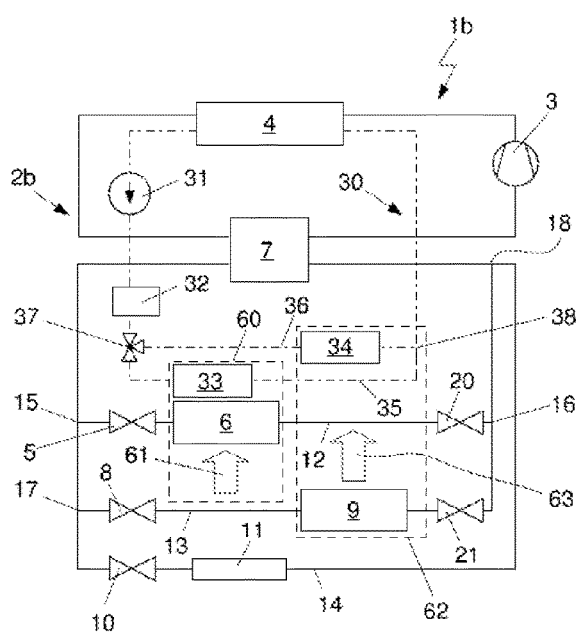

FIG. 3 shows an air conditioning system 1*b* with a refrigeration circuit 2*b* and with a coolant circuit 30. The coolant circuit 30 is designed in accordance with the coolant circuit 30 of the air conditioning system 1*a* according to FIG. 2. The air conditioning system 1*b* differs from the air conditioning system 1*a* only in the design of the refrigeration circuits 2*a*, 2*b*.

Instead of the arrangement of the fourth expansion device 19 between the first opening point 16 of the first flow path 12 as well as of the second flow path 13 and the second opening point 18 of the third flow path 14, the refrigeration circuit 2*b* comprises two expansion devices 20, 21 designed preferably as expansion valves. Here, in each case, an expansion device 20, 21 is located downstream in flow direction of the refrigerant with respect to the first refrigerant-air heat exchanger 6 within the first flow path 12 and also with respect to the second refrigerant-air heat exchanger 9 within the second flow path 13, so that the first refrigerant-air heat exchanger 6 is arranged between the expansion device 5 and the expansion device 20, and the second refrigerant-air heat exchanger 9 is arranged between the expansion device 8 and the expansion device 21.

The design of the expansion devices 5, 8 which are located upstream with respect to the refrigerant-air heat exchangers 6, 9 in flow direction of the refrigerant as well as of the expansion devices 20, 21 which are located downstream with respect to the refrigerant-air heat exchangers 6, 9 enables the operation of the refrigeration circuit 2*b* at different pressure levels, in particular one below the other relative to one another within the refrigerant-air heat exchangers 6, 9 and also in comparison to the heat exchangers 11 as heat source. Here, the refrigerant can flow through the refrigerant-air heat exchangers 6, 9 at different pressure levels or at the same pressure level, such as the high-pressure level, the medium-pressure level or the low-pressure level, while the heat exchanger 11 is supplied with refrigerant at low-pressure level. The respective pressure level is adjusted by means of the expansion devices 5, 8, 20, 21 designed as expansion valves, wherein the expansion devices 20, 21 can be continuously adjusted between the positions "fully opened" and "closed." The expansion devices 5, 8 which are located upstream with respect to the refrigerant-air heat exchangers 6, 9 in flow direction of the refrigerant are preferably designed as lockable expansion valves, while the expansion devices 20, 21 which are located downstream with respect to the refrigerant-air heat exchangers 6, 9 in flow direction of the refrigerant are preferably designed as active and passive pressure control devices.

In the two independent components 60, 62 of the air conditioning unit with the refrigerant-air heat exchangers 6, 9 which in each case can be operated independently of one another, in particular as evaporators, the mass streams of the refrigerant are in each case controlled in a load-dependent manner by the expansion devices 5, 8 which are located upstream with respect to the refrigerant-air heat exchangers 6, 9 and designed as switchable expansion valves. The pressure levels and thus the temperature levels of the refrigerant are adjusted individually by means of the expansion devices 19, 20, 21 which are located downstream with respect to the refrigerant-air heat exchangers 6, 9 in flow direction of the refrigerant and designed as switchable expansion valves, and which are also referred to as delay throttle. Thus, the refrigerant-air heat exchangers 6, 9 operated as evaporators are optimally adjustable independently of other components. Here, for example, the outputs of the first refrigerant-air heat exchanger 6 operated as evaporator within the first component 60 of the air conditioning unit, which is arranged in the front area of the motor vehicle, or of the second refrigerant-air heat exchanger 9 operated as evaporator within the second component 62 of the air conditioning unit, which is arranged in the middle or rear area of the motor vehicle, can be reduced continuously down to "zero" with at the same time full output of the compressor 3, if, for example, only seats or seat rows other than the front seats of a motor vehicle with autonomous vehicle control are occupied. Thus, one of the refrigerant-air heat exchangers 6, 9, in particular the first evaporator 6, can be operated at full load with low pressure of the refrigerant, for example, at a target temperature of 3° C. with maximum blower output, while the other refrigerant-air heat exchanger 6, 9, in particular the second evaporator 9, is operated in a mode with minimum blower output at a target temperature of 8° C. Here, the first evaporator 6 can be supplied with environmental air or fresh air, while the second evaporator 9 is supplied during recirculated air operation with air from the vehicle compartment, wherein the heat exchange surface does not ice up.

In the air conditioning units known from the prior art, with two refrigerant-air heat exchangers operated as evaporators for conditioning the passenger space, there is usually icing up of the evaporator arranged within the second component of the air conditioning unit provided for the middle or rear area of the motor vehicle, which is operated with minimal blower output in comparison to the high-output blower evaporator of the first component of the air conditioning unit. In these conventional air conditioning units, then either the blower output of the second component of the air conditioning unit has to be increased, or the expansion device associated with the refrigerant-air heat exchanger of the second component of the air conditioning unit has to be closed, in order to prevent supplying the heat exchanger with refrigerant, which in turn would lead to an increase in the temperature of the intake air.

By means of the expansion devices 19, 20, 21 operated in each case as delay throttle, a local rise of the suction pressure or of the evaporation pressure of the refrigerant within the refrigerant-air heat exchangers 6, 9 is enabled. Here, due to an increase in the evaporation temperature, also referred to as effective evaporator temperature, the evaporator output can in each case be reduced.

In order to further increase the efficiency during the operation of the air conditioning system 1*a*, 1*b* in the heat pump mode, the second component 62 of the air conditioning unit can be used in order to transfer heat in the ideally adjustable temperature range via the second refrigerant-air heat exchanger 9 from the air discharged from the passenger compartment to the refrigerant. Since the second component 62 of the air conditioning unit is arranged in the rear area of the motor vehicle, in particular in the aft area, the air which is considerably cooled after the heat transfer to the refrigerant can be discharged directly into the environment.

The refrigeration circuits and the operating modes can be used for any refrigerant which undergoes on the low-pressure side a phase transition from liquid to gaseous. On the high-pressure side, the medium releases heat absorbed by gas cooling/condensation and subcooling to a heat sink. Natural substances can be used as refrigerant, such as R744, R717 and the like, combustible substances such as R290, R600, R600a and the like, and chemical substances such as R134a, R152a, HFO-1234yf as well as various refrigerant mixtures.

Figure 4:
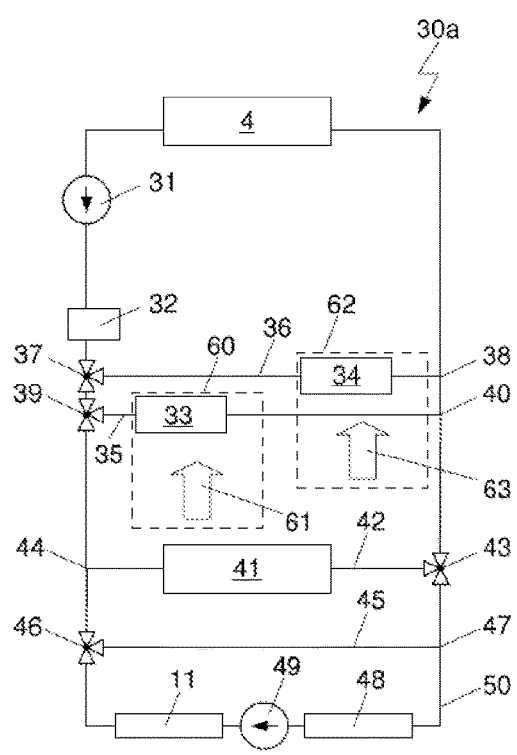
FIG. 4: a coolant circuit from FIGS. 2 and 3 with additional heat exchangers as heat sources or heat sinks as well as refrigerant-air heat exchangers arranged parallel to one another for conditioning the intake air for the passenger compartment.

From FIG. 4, one can see a coolant circuit 30a with additional heat exchangers as heat sources or heat sinks and with coolant-air heat exchangers 33, 34 which are arranged parallel to one another and through which coolant can flow for conditioning the intake air for the passenger compartment. The coolant circuit 30a has been enlarged in comparison to the air conditioning systems 1a, 1b according to FIGS. 2 and 3. The components which are identical compared to the coolant circuit 30 of the air conditioning systems 1a, 1b according to FIGS. 2 and 3 are provided with identical reference numerals.

In addition to the first coolant-air heat exchanger 33 and the second coolant-air heat exchanger 34, the coolant circuit 30a comprises a third heat exchanger designed as coolant-air heat exchanger 41, for example, for heat exchange with the environmental air. The third coolant-air heat exchanger 41 and the coolant-air heat exchangers 33, 34 for heating the intake air for the passenger compartment are arranged so that they can be supplied with coolant parallel to one another. The third coolant-air heat exchanger 41 is formed within a third flow path 42 which extends from a branching point 39 to an opening point 40. The branching point 39 is advantageously formed as a three-way valve.

In addition, the coolant circuit 30a comprises a fourth flow path 45 formed between a branching point 43, in particular a three-way valve, and an opening point 44, path which in turn is designed to be parallel to the flow paths 35, 36, 42 of the coolant-air heat exchangers 33, 34, 41. The fourth flow path 45 is used here as needed in each case as a bypass for the passage of the coolant without in each case supplying one or more of the coolant-air heat exchangers 41 with coolant.

An additional fifth flow path 50 of the coolant circuit 30a extends from a branching point 46, in particular from a three-way valve, to an opening point 47 and is again arranged parallel to the flow paths 35, 36, 42 of the coolant-air heat exchangers 33, 34, 41 as well as to the fourth flow path 45 designed as bypass.

Within the fifth flow path 50, the heat exchanger 11 of the refrigeration circuit 1a, 1b, an additional heat exchanger 48 as well as a second conveying device 49 are formed. The heat exchanger 48 could be used for cooling components of the drive train, such as a battery or an engine, or electrical components. The heat transferred as waste heat from the components of the drive train into the coolant circuit 30a can be released, in the heat exchanger 11, to the refrigerant of the refrigeration circuit 1a, 1b, or can be transferred, in the heat exchangers 33, 34 arranged in the components 60, 62 of the air conditioning unit, to intake air of the passenger compartment.

The second conveying device 49 is necessary, for example, if no heat is transferred from the refrigerant to the coolant in the refrigerant-coolant heat exchanger 4, and heat either has to be released from the coolant either via at least one of the coolant-air heat exchangers 33, 34 to the intake air for the passenger compartment or in the coolant-air heat exchanger 41 to the environmental air or in the heat exchanger 11 to the refrigerant. In this case, the first conveying device 31 can be out of operation.

During the operation of the air conditioning system 1a, 1b in the heat pump mode and during the operation in the reheating mode, the waste heat of the components of the drive train is supplied in each case to the components 60, 62 of the air conditioning unit and thus via the coolant-air heat exchangers 33, 34 to the intake air for the passenger compartment.

During the operation in the refrigeration mode, the waste heat of the components of the drive train is also transferred in the coolant-air heat exchanger 41, also referred to as low-temperature cooler, to the environmental air. The coolant-air heat exchanger 41 is arranged in the front area of the motor vehicle, for example, in order to use the head wind as air flowing to the heat exchanger.

If the heating output in the coolant circuit 30a necessary to achieve a desired comfort is not sufficient, then the add-on thermal heat exchanger 32 designed in particular as electrical resistance heater (PTC) can be put into operation. But due to the multiple use of waste heat, the heating output needed is very low.

The coolant heated by the uptake of the waste heat is distributed correspondingly via the controllable three-way valves 37, 39, 43, 46.

Figure 5:
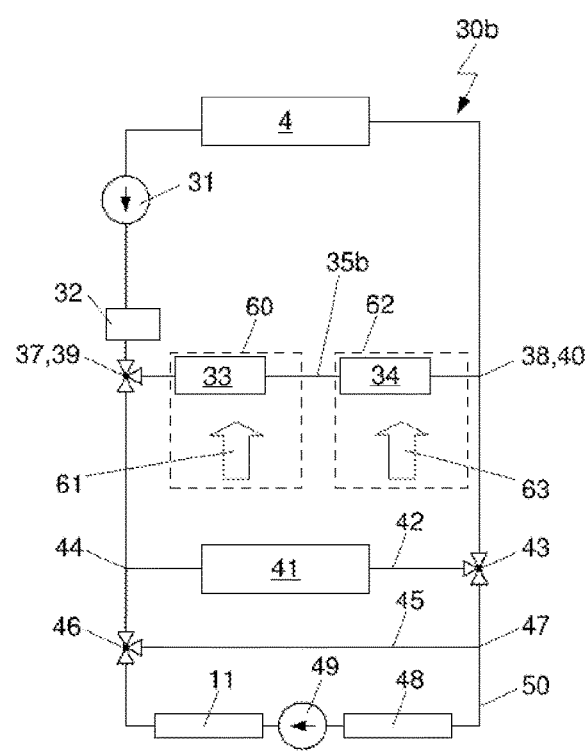
FIG. 5: a coolant circuit similar to FIG. 4 with refrigerant-air heat exchangers arranged in series with respect to one another for conditioning the intake air for the passenger compartment.

In FIG. 5, a coolant circuit 30b similar to the coolant circuit 30a from FIG. 4 is shown. In comparison to the coolant circuit 30a from FIG. 4, the coolant-air heat exchangers 33, 34 for the conditioning of the intake air for the passenger compartment are arranged so as to enable flow through them in series one after the other. Here, the coolant-air heat exchangers 33, 34 are arranged within a common flow path 35b which extends from the common branching point 37, 39 to a common opening point 38, 40.

Figure 6:
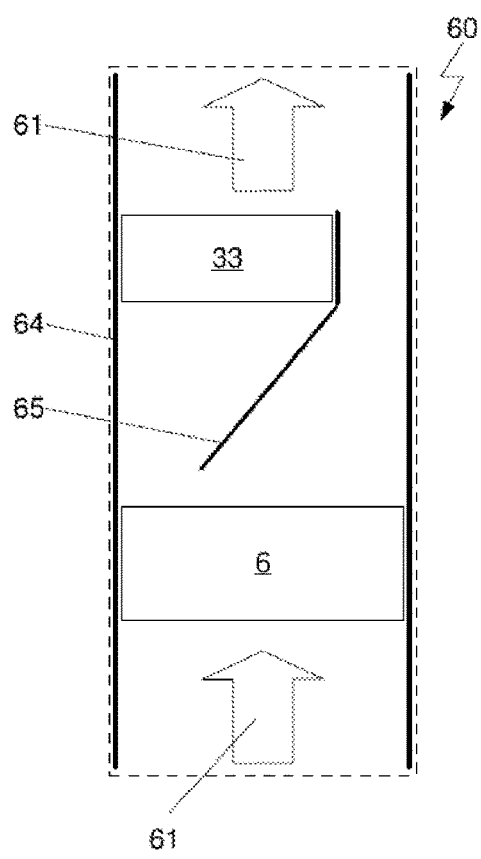
FIG. 6: a component of an air conditioning unit for conditioning the intake air for a front area of the passenger compartment as well as FIG. 7: a component of an air conditioning unit for conditioning the intake air for a rear area of the passenger compartment.

FIG. 6 shows the first component 60 of the air conditioning unit for the conditioning of the intake air for a front area of the passenger compartment. The first refrigerant-air heat exchanger 6 and the first coolant-air heat exchanger 33, which are arranged one after the other in flow direction 61 of the intake air of the passenger compartment, are supplied one after the other with the intake air for the passenger compartment.

The first refrigerant-air heat exchanger 6 extends over the entire flow cross-section of a housing 64 of the first component 60 of the air conditioning unit, so that the entire air mass stream supplied to the component 60 flows over the heat exchange surface of the refrigerant-air heat exchanger 6.

Subsequently, as needed, the air mass stream can be heated as it flows over the first coolant-air heat exchanger 33. The inflow of the first coolant-air heat exchanger 33 is controlled by means of an air guide device 65 formed as a temperature flap. Here, the air mass stream as a partial air mass stream can be run over the heat exchange surface of the first coolant-air heat exchanger 33 or as a partial air mass stream through a bypass around the first coolant-air heat exchanger 33, before the air mass stream is introduced, optionally mixed again, as intake air into the passenger compartment. The outlet temperature of the intake air from the component 60 is also adjusted by mixing of the air. The partial air mass streams can be divided in the proportion of between 0 and 100%.

Figure 7:
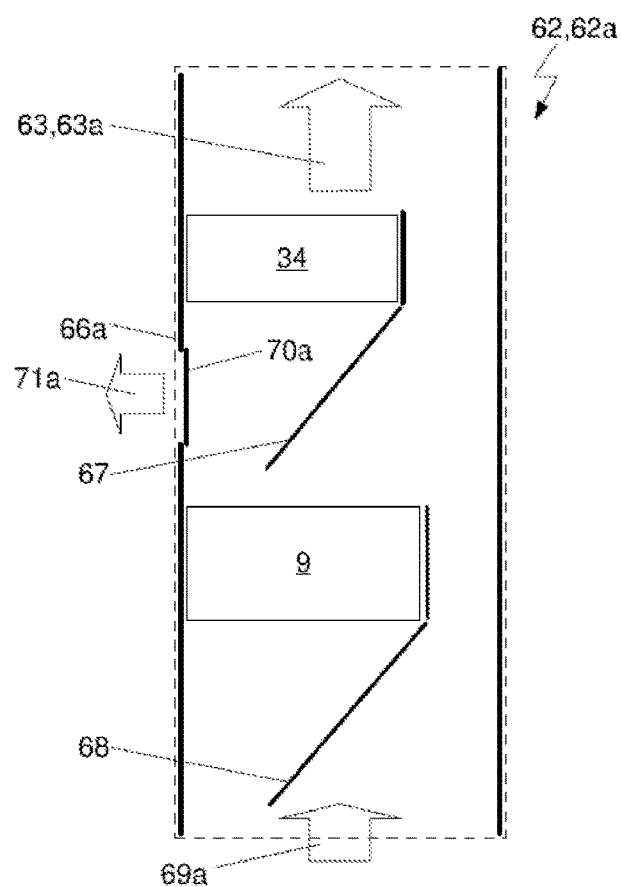

From FIG. 7, one can see the second component 62, 62a of the air conditioning unit for conditioning the intake air for a middle or rear area of the passenger compartment. The second refrigerant-air heat exchanger 9 and the second coolant-air heat exchanger 34 arranged one after the other in flow direction 63, 63a of the air of the passenger compartment can be supplied one after the other with intake air for the passenger compartment.

The second refrigerant-air heat exchanger 9 here does not extend over the entire flow cross-section of a housing 66a of the second component 62, 62a of the air conditioning unit, so that the air mass stream flowing in flow direction 69a into the component 62, 62a, as a partial air mass stream, can be led over the heat exchanger surface of the second refrigerant-air heat exchanger 9 or as a partial air mass stream through a bypass around the second refrigerant-air heat exchanger 9. The inflow of the second refrigerant-air heat exchanger 9 is controlled by means of an air guide device 68 formed as a temperature flap. The mass streams of the air can be divided in the proportion of between 0 and 100%.

Subsequently, as needed, the air mass stream can be discharged as a partial air mass stream through an opening formed within the housing 66a into the environment, and can be heated as a partial air mass stream as it flows over the second coolant-air heat exchanger 34 or as a partial air mass stream guided as intake air for the passenger compartment in a bypass around the second coolant-air heat exchanger 34. The inflow of the second coolant-air heat exchanger 34 is controlled by means of an air guide device 67 formed as a temperature flap. In order to discharge the air, for example, cold air cooled as it flows over the second refrigerant-air heat exchanger 9 operated as an evaporator, in flow direction 71a into the environment, a position of an air guide device 70a formed preferably as a flap is varied. The air guide device 70a is used for opening and closing the opening formed in the housing 66a.

Here, the intake air for the passenger compartment, which is guided as partial air mass stream is run over the heat exchange surface of the second coolant-air heat exchanger 34 or as partial air mass stream through a bypass around the second coolant-air heat exchanger 34, can optionally be mixed again. The outlet temperature of the intake air from component 62, 62a is also adjusted by the mixing of the air. The mass streams of the air can in each case be divided in the proportion of between 0 and 100%.

If, for example, during the operation of the air conditioning system 1a, 1b in the heat pump mode, the waste heat of the air of the passenger compartment is used, a partial air mass stream is cooled and/or dehumidified as it flows over the heat exchange surface of the second refrigerant-air heat exchanger 9 operated as evaporator, and is subsequently discharged into the environment through the opened air guide device 70a. An additional partial air mass stream is heated as it flows over the heat exchange surface of the second coolant-air heat exchanger 34 and is fed to the passenger compartment.

The air throughflow occurs substantially from the front area to the rear area of the passenger compartment, so that all the vehicle occupants receive uniform comfort. The arrangement of the air outlet openings in the rear area of the motor vehicle minimizes the risk of rainwater entering or of leaked-in air flowing in. The necessary openings are formed in standard vehicles.

Figure 8A:
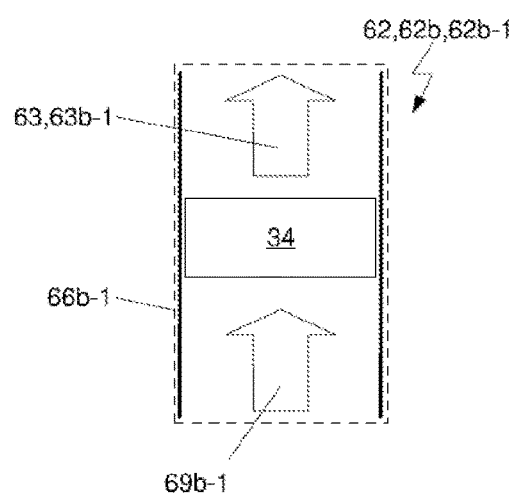
FIG. 8A: a first element of a component of an air conditioning unit for conditioning the intake air for the middle and rear area of the passenger compartment as well as FIG. 8B: a second element of the component of an air conditioning unit for conditioning the intake air for the middle and the rear area of the passenger compartment.
Figure 8B:
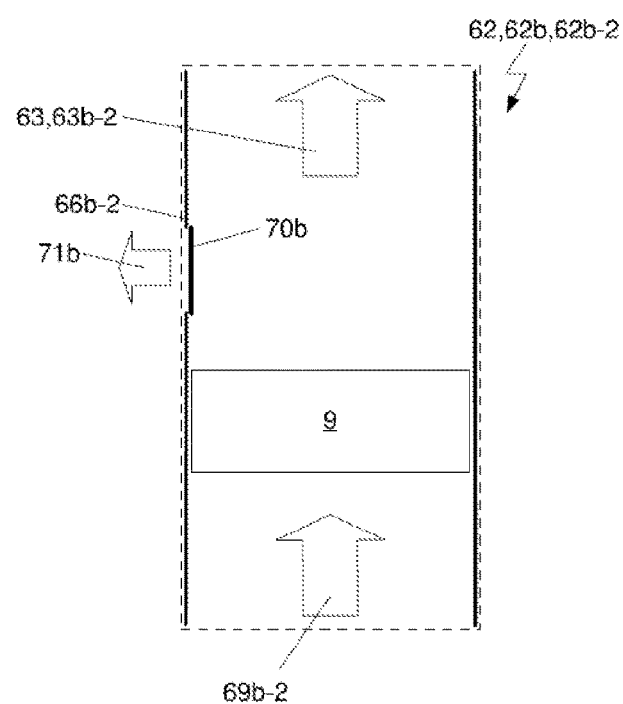

From FIG. 8A, one can see a first element 62b-1 of a second component 62, 62b of an air conditioning unit for the conditioning of the intake air in particular for the middle area of the passenger compartment, while in FIG. 8B, a second element 62b-2 of the second component 62, 62b of the air conditioning unit for conditioning the intake air in particular for the rear area of the passenger compartment is shown. In comparison to the second component 62a of the air conditioning unit from FIG. 7, the second refrigerant-air heat exchanger 9 and the second coolant-air heat exchanger 34 are arranged in separately formed housings 66b-1, 66b-2. Here, the second coolant-air heat exchanger 34 is arranged within the housing 66b-1 of the first element 62b-1 of the second component 62b, and the second refrigerant-air heat exchanger 9 is arranged within the housing 66b-2 of the second element 62b-2 of the second component 62b of the air conditioning unit. The heat exchangers 9, 34 can be supplied independently of one another with air, in particular air discharged from the passenger compartment.

The coolant-air heat exchanger 34 extends over the entire flow cross-section of the housing 66b-1, so that the entire air mass stream supplied to the first element 62b-1 of the second component 62b via a blower in flow direction 69b-1 flows over the heat exchange surface of the coolant-air heat exchanger 34 and is heated. The heated air is supplied again to the passenger compartment in flow direction 63b-1.

The refrigerant-air heat exchanger 9 extends over the entire flow cross-section of the housing 66b-2, so that the entire air mass stream supplied to the second element 62b-2 of the second component 62b via a blower in flow direction 69b-2 flows over the heat exchange surface of the refrigerant-air heat exchanger 9 and is cooled and/or dehumidified. As needed, the air mass stream thus conditioned thus can subsequently be discharged as a partial air mass stream through an opening formed within the housing 66b-2 into the environment or be guided as a partial air mass stream as intake air in flow direction 63b-2 into the passenger compartment. For the purpose of discharging the cold air, cooled as it flows over the refrigerant-air heat exchanger 9 operated as evaporator, in flow direction 71b into the environment, a position of an air guide device 70b preferably designed as a flap is varied. The air guide device 70b is used here for opening and closing the opening formed in the housing 66b-2. The mass streams of the air can be divided in the proportion of between 0 and 100%.

The second element 62b-2 of the second component 62b of the air conditioning unit is formed with the opening provided as an air outlet to the environment as well as with the associated air guide device 70b and the control or operating mechanism thereof, preferably as an adapter element which is arranged as an adapter element in flow direction 69b-2 of the air after the evaporator 9. Using the adapter, a conventional aft air conditioning unit can be retrofitted.

The air conditioning unit from FIGS. 8A and 8B, divided into two in comparison to the second component 62a of the air conditioning unit from FIG. 7, is formed without bypass paths around the refrigerant-air heat exchanger 9 as well as around the coolant-air heat exchanger 34 and without associated air guide devices for guiding and dividing the air mass streams, but with an additional blower. The additional blower is used for conveying the air mass stream through the first element 62b-1 of the second component 62b and thus through the coolant-air heat exchanger 34. The air conditioning devices according to FIG. 7, on the one hand, and of FIGS. 8A and 8B, on the other hand, are here controlled and operated in the same way.

Figure 9A:
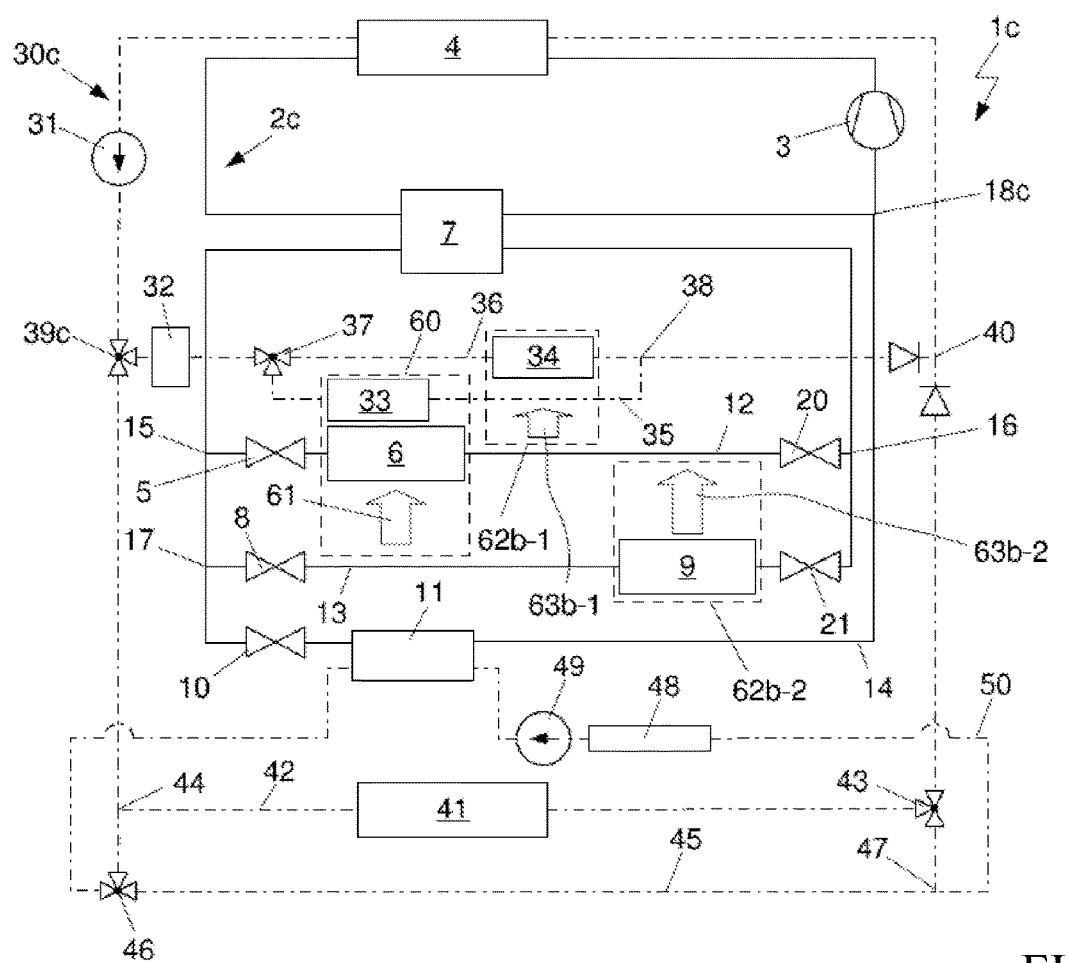
FIGS. 9A and 9B: in each case an air conditioning system with a refrigeration circuit similar to the refrigeration circuit of the air conditioning system according to FIG. 3, with a coolant circuit similar to the coolant circuit according to FIG. 4, and with an air conditioning unit with elements according to FIGS. 8A and 8B, and FIGS. 10A-10C: the air conditioning system according to FIG. 9A, integrated in a motor vehicle respectively during operation in different operating modes.
Figure 9B:
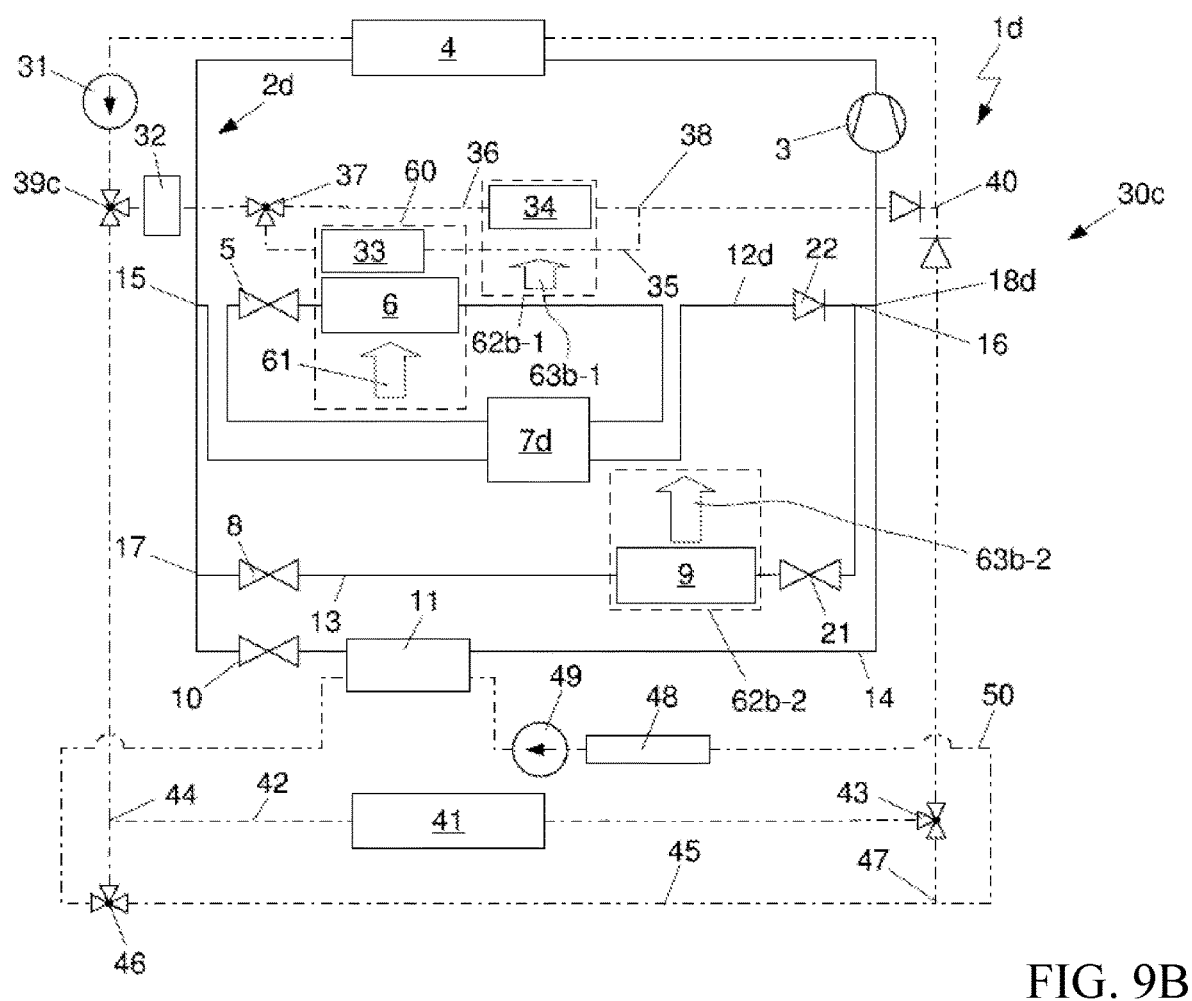

FIGS. 9A and 9B each show an air conditioning system 1c, 1d with a refrigeration circuit 2c, 2d similar to the refrigeration circuit 2b of the air conditioning system 1b according to FIG. 3, with a coolant circuit 30c similar to the coolant circuit 30a according to FIG. 4, as well as with an air conditioning unit with elements 62b-1, 62b-2 according to FIGS. 8A and 8B. The components which are identical compared to the refrigeration circuit 2b of the air conditioning system 1b and the coolant circuit 30a of the air conditioning systems 1a, 1b are marked with identical reference numerals.

The refrigeration circuit 2c of the air conditioning system 1c from FIG. 9A differs from the refrigeration circuit 2b of the air conditioning system 1b according to FIG. 3 only in the arrangement of the second opening point 18c of the third flow path 14, and thus it also represents an alternative embodiment of the refrigeration circuit for the air conditioning systems 1a, 1b.

Instead of the arrangement of the second opening point 18 of the third flow path 14 between the first opening point 16 of the first flow path 12 and of the second flow path 13 and the inner heat exchanger 7, the second opening point 18c of the refrigeration circuit 2c is arranged between the inner heat exchanger 7 and the compressor 3, in particular after the inner heat exchanger 7 in flow direction of the refrigerant. Thus, a partial mass stream guided through the third flow path 14 is not guided through the low-pressure area of the inner heat exchanger 7.

The coolant circuit 30c of the air conditioning system 1c from FIG. 9A differs from the coolant circuit 30a according to FIG. 4 in particular in the arrangement of the branching point 39c of the third flow path 42, and thus it also represents an alternative embodiment of the coolant circuit for the air conditioning systems 1a, 1b.

Instead of the arrangement of the branching point 39 of the third flow path 42 between the branching point 37 of the first flow path 35 and of the second flow path 36 and the third coolant-air heat exchanger 41, the branching point 39c of the coolant circuit 30c is arranged between the conveying device 31 and the add-on thermal heat exchanger 32, in particular before the add-on thermal heat exchanger 32 in flow direction of the coolant. Thus, a mass stream of the coolant which is guided through the third flow path 42 with the third coolant-air heat exchanger 41 or through the fifth flow path 50 with the heat exchanger 11, 48 is not guided through the add-on thermal heat exchanger 32.

An additional difference between the coolant circuit 30c of the air conditioning system 1c from FIG. 9A and the coolant circuit 30a according to FIG. 4 consists in the design of non-return valves. The non-return valves in each case are arranged in flow direction of the coolant before the opening point 40 of the third flow path 42. Here, a first non-return valve is designed between the opening point 38 of the first flow path 35 and of the second flow path 36 and the opening point 40, and a second non-return valve is designed between the third coolant-air heat exchanger 41 and the opening point 40. The non-return valves are each used for preventing back flow of the coolant starting from the opening point 40 into the corresponding area of the coolant circuit 30c.

The coolant circuits 30c of the air conditioning systems 1c, 1d according to FIGS. 9A and 9B are identical. The refrigeration circuit 2d of the air conditioning system 1d from FIG. 9B differs from the refrigeration circuit 2c of the air conditioning system 1c according to FIG. 9A only in the arrangement of the inner heat exchanger 7d, and thus it also represents an alternative embodiment of the refrigeration circuit for the air conditioning systems 1a, 1b.

Instead of the arrangement of the inner heat exchanger 7 on the high-pressure side between the refrigerant-coolant heat exchanger 4 and the first branching point 15 and on the low-pressure side between the first opening point 16 and the second opening point 18c, the inner heat exchanger 7d is arranged completely within the first flow path 12d. Here, the inner heat exchanger 7d is formed on the high-pressure side between the first branching point 15 and the second expansion device 5 and on the low-pressure side between the first refrigerant-air heat exchanger 6 and the first opening point 16. The first flow path 12d in addition comprises a non-return valve 22 which is arranged between the inner heat exchanger 7d and the first opening point 16, in order to prevent back flow of refrigerant guided through the second flow path 13 or the third flow path 14 into the first flow path 12d.

According to an embodiment, not represented, the refrigeration circuit 2c according to FIG. 9A is formed within the first flow path 12, instead of the expansion device 20, with a non-return valve. The non-return valve arranged between the first refrigerant-coolant heat exchanger 6 and the first opening point 16 is used to prevent back flow of refrigerant guided through the second flow path 13 or the third flow path 14 into the first flow path 12.

Figure 10A:
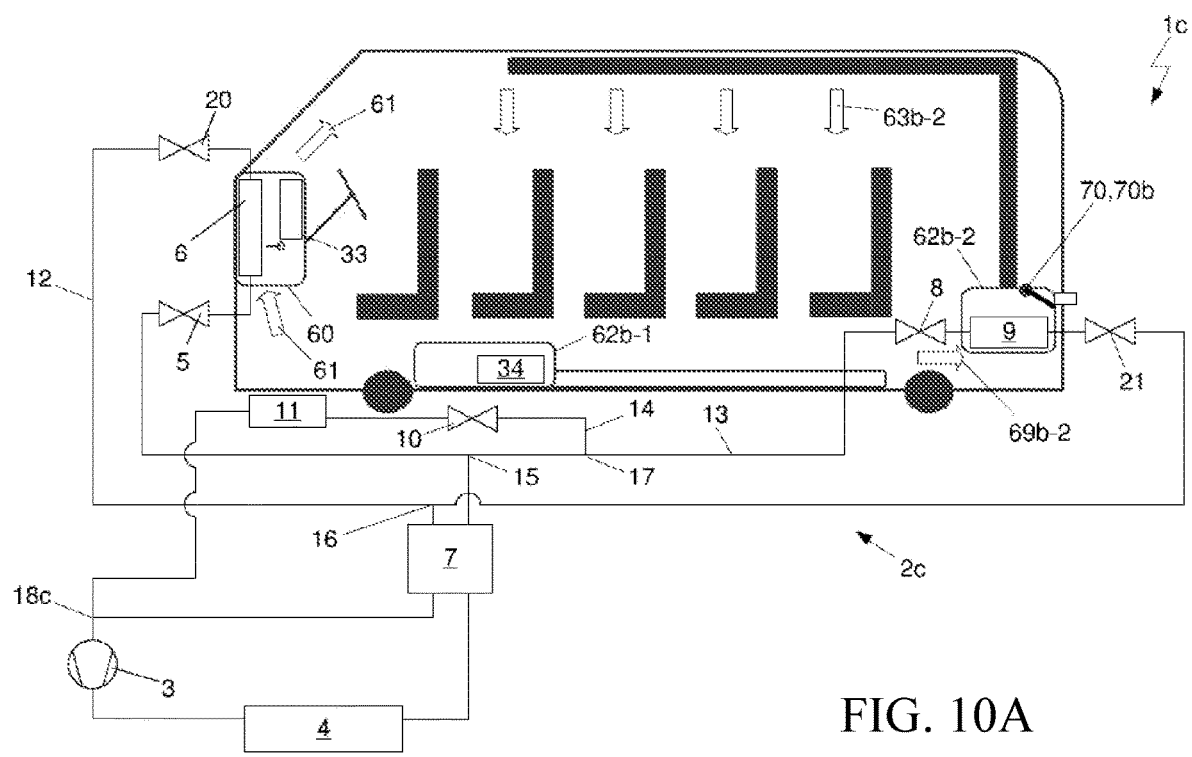
Figure 10B:
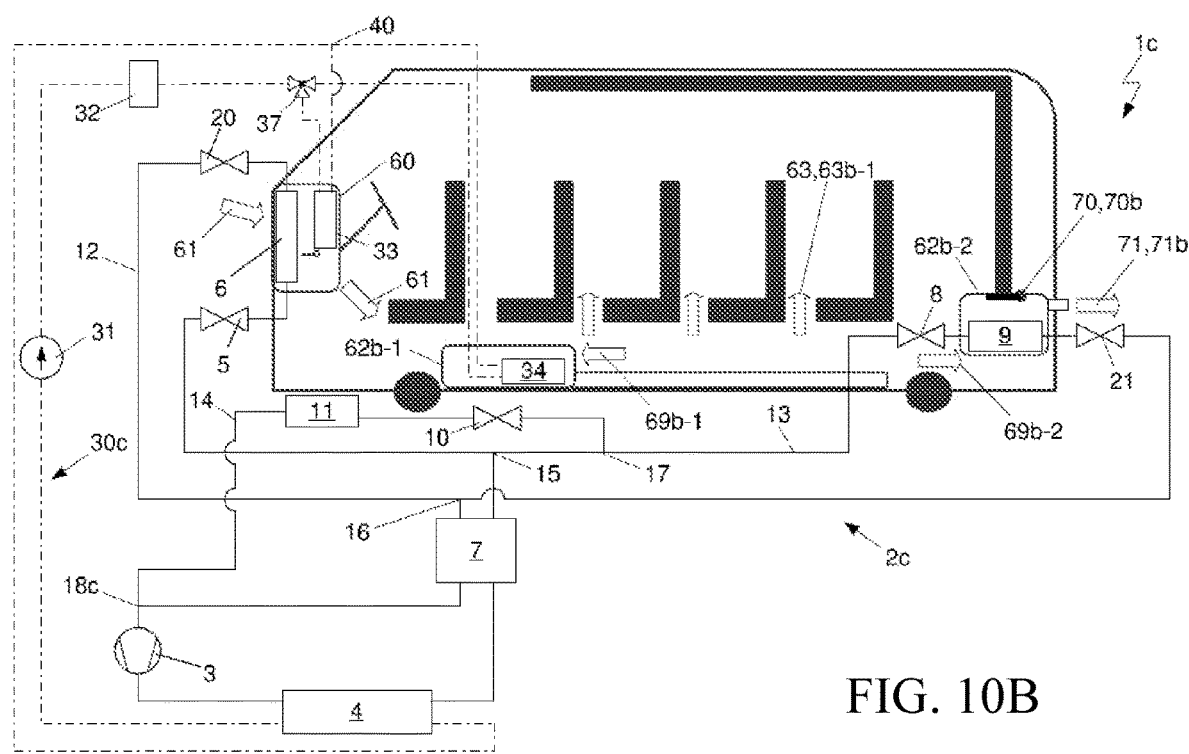
Figure 10C:
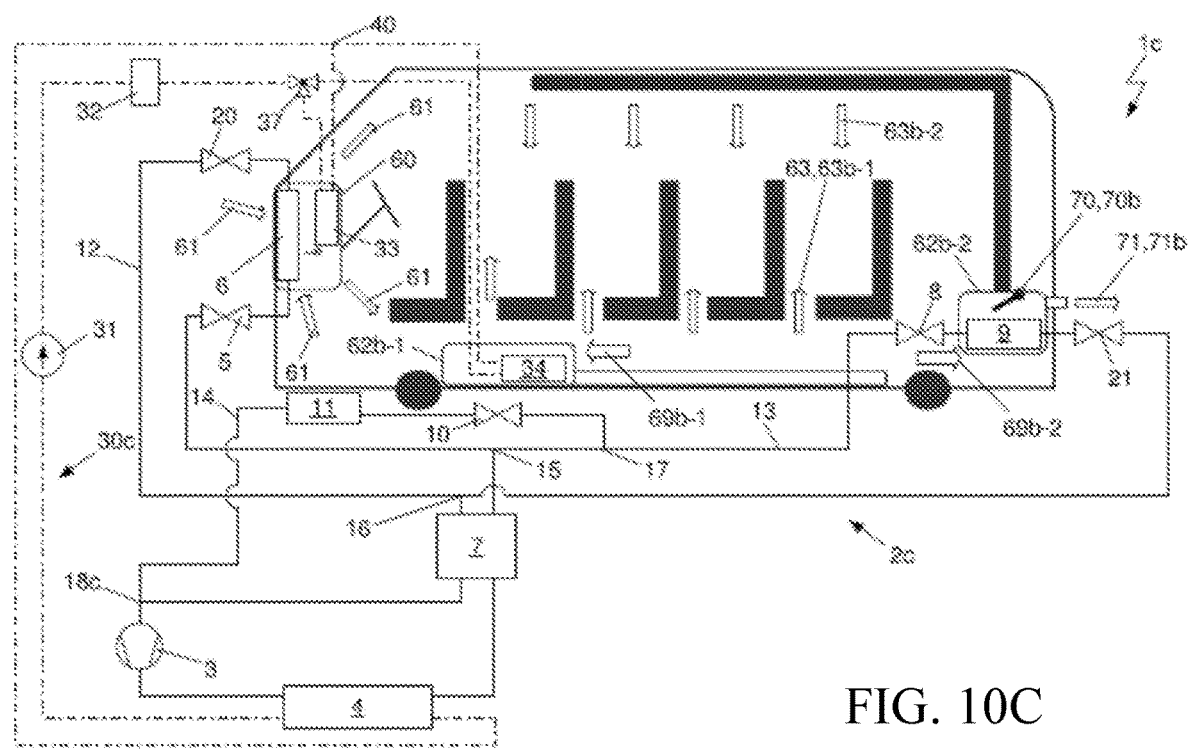

From FIGS. 10A to 10C, one can see the air conditioning system 1c according to FIG. 9A during operation in different operating modes. The air conditioning system 1c is represented in each case integrated in a motor vehicle.

During the operation of the refrigeration circuit 2c in a refrigeration mode according to FIG. 10A, both the first refrigerant-air heat exchanger 6 arranged within the first component 60 of the air conditioning unit and also the second refrigerant-air heat exchanger 9 arranged within the second element 62b-2 of the second component 62b of the air conditioning unit are operated as evaporators for the cooling and/or dehumidification of the air.

The fresh air from the environment suctioned in flow direction 61 into the first component 60 of the air conditioning unit from the environment, recirculated air from the passenger compartment or mixed air consisting of fresh air and recirculated air flows over the heat exchange surface of the first refrigerant-air heat exchanger 6 and is introduced, cooled and/or dehumidified, in the front area into the passenger compartment. The recirculated air from the passenger compartment suctioned in flow direction 69b-2 into the second element 62b-2 of the second component 62b of the air conditioning unit flows over the heat exchange surface of the second refrigerant-air heat exchanger 9 and is introduced, cooled and/or dehumidified, in the rear as well as in the middle area into the passenger compartment. Here, the second element 62b-2 of the second component 62b of the air conditioning unit is designed in such a manner that preferably several air outlets into the passenger compartment are arranged in the area of the roof, so that the conditioned intake air flows in flow direction 63b-2 from above and locally distributed into the passenger compartment. The air guide device 70b is oriented so that it closes the opening formed in the housing 66b-2 of the second element 62b-2 of the second component 62b of the air conditioning unit, so that the conditioned air is introduced completely into the passenger compartment.

Both in the first coolant-air heat exchanger 33 arranged within the first component 60 of the air conditioning unit and also in the second coolant-air heat exchanger 34 arranged within the first element 62b-1 of the second component 62b of the air conditioning unit, no heat is transferred to the intake air for the passenger compartment. The heat exchanger 11 for the temperature control of the coolant circulating in the coolant circuit for conditioning components of the drive train, such as a battery or an engine, or electrical components, can also be operated as evaporator and be supplied with refrigerant parallel to the refrigerant-air heat exchangers 6, 9.

The heat transferred to the refrigerant in the heat exchangers 6, 9, 11 is transferred in the refrigerant-coolant heat exchanger 4 to the coolant and from the coolant to the environmental air.

During the operation of the coolant circuit 2c in a heat pump mode according to FIG. 10B, the second refrigerant-air heat exchanger 9 arranged within the second element 62b-2 of the second component 62b of the air conditioning unit and the heat exchanger 11 are operated, for the temperature control of the coolant circulating in the coolant circuit for the conditioning of components of the drive train, in each case as evaporator and thus as heat source for the refrigerant. The first refrigerant-air heat exchanger 6 arranged within the first component 60 of the air conditioning unit is not supplied with refrigerant.

The recirculated air from the passenger compartment suctioned in flow direction 69b-2 into the second element 62b-2 of the second component 62b of the air conditioning unit flows over the heat exchange surface of the second refrigerant-air heat exchanger 9 and is discharged, cooled and/or dehumidified, into the environment. The air guide device 70b is oriented so that it completely opens the opening formed in the housing 66b-2 of the second element 62b-2 of the second component 62b of the air conditioning unit, so that the air is discharged completely into the environment in flow direction 71b.

The heat transferred to the coolant in the heat exchangers 9, 11 is transferred to the coolant in the refrigerant-coolant heat exchanger 4 and transferred from the coolant to the intake air for the passenger compartment. When the heating output in the coolant circuit 30c necessary to reach a desired comfort is not reached, the add-on thermal heat exchanger 32, designed in particular as an electrical resistance heater (PTC), is moreover operated. Both in the first coolant-air heat exchanger 33 arranged within the first component 60 of the air conditioning unit and also in the second coolant-air heat exchanger 34 arranged within the first element 62b-1 of the second component 62b of the air conditioning unit, heat is transferred to the intake air for the passenger compartment.

The air suctioned in flow direction 61 into the first component 60 of the air conditioning unit flows over the heat exchange surface of the first coolant-air heat exchanger 33, and it is introduced, heated, in the front area of the passenger compartment. The recirculated air from the passenger compartment suctioned in flow direction 69b-1 into the first element 62b-1 of the second component 62b of the air conditioning unit flows over the heat exchange surface of the second coolant-air heat exchanger 34 and is introduced, heated, in the rear and in the middle area into the passenger compartment. Here, the first element 62b-1 of the second component 62b of the air conditioning unit is formed in such a manner that preferably several air outlets are arranged in the passenger compartment in the area of the footwell, so that the heated intake air flows in flow direction 63b-1 from below and locally distributed into the passenger compartment.

During the operation of the refrigeration circuit 2c in a reheating mode according to FIG. 10C, both the first refrigerant-air heat exchanger 6 arranged within the first component 60 of the air conditioning unit and also the second refrigerant-air heat exchanger 9 arranged within the second element 62b-2 of the second component 62b of the air conditioning unit are operated as evaporators for the cooling and/or dehumidification of the air.

The fresh air from the environment suctioned in flow direction 61 into the first component 60 of the air conditioning unit, recirculated air from the passenger compartment or mixed air consisting of fresh air and recirculated air flows over the heat exchange surface of the first refrigerant-air heat exchanger 6 and, cooled and/or dehumidified, it is heated as it flows over the heat exchange surface of the first coolant-air heat exchanger 33 and is introduced in the front area into the passenger compartment.

The recirculated air from the passenger compartment suctioned in flow direction 69b-2 into the second element 62b-2 of the second component 62b of the air conditioning unit flows over the heat exchange surface of the second refrigerant-air heat exchanger 9 and is introduced, cooled and/or dehumidified, as needed partially in the rear and in the middle area into the passenger compartment and is discharged into the environment. The air guide device 70b is oriented so that it partially closes the opening formed in the housing 66b-2 of the second element 62b-2 of the second component 62b of the air conditioning device, so that the conditioned air is introduced divided into the passenger compartment and discharged into the environment.

The heat transferred in the refrigerant-air heat exchangers 6, 9 to the refrigerant is transferred in the refrigerant-coolant heat exchanger 4 to the coolant and in the coolant-air heat exchangers 33, 34 from the coolant to the intake air for the passenger compartment and optionally also to the environmental air.

The environmental air from the passenger compartment suctioned in flow direction 69b-1 into the first element 62b-1 of the second component 62b of the air conditioning unit flows over the heat exchange surface of the second coolant-air heat exchanger 34 and is introduced heated in the rear as well as in the middle area into the passenger compartment.

LIST OF REFERENCE NUMERALS

1', 1a, 1b, 1c, 1d Air conditioning system
2', 2a, 2b, 2c, 2d Refrigeration circuit
3 Compressor
4 Refrigerant-coolant heat exchanger
5 First expansion device
6 First refrigerant-air heat exchanger, evaporator
7, 7d Inner heat exchanger
8 Second expansion device
9 Second refrigerant-air heat exchanger, evaporator
10 Third expansion device
11 Heat exchanger
12, 12d First flow path
13 Second flow path
14 Third flow path
15 First branch point
16 First opening point
17 Second branch point
18, 18c, 18d Second opening point
19 Fourth expansion device
20, 21 Expansion device
22 Non-return valve
30', 30 Coolant circuit
30a, 30b, 30c Coolant circuit
31 Conveying device
32 Add-on thermal heat exchanger
33 First coolant-air heat exchanger, thermal heat exchanger 34 Second coolant-air heat exchanger, thermal heat exchanger
35, 35b First flow path
36 Second flow path
37, 43, 46 Branch point, three-way valve
38, 40, 44, 47 Opening point
39, 39c Branch point, three-way valve
41 Third coolant-air heat exchanger
42 Third flow path
45 Fourth flow path
48 Heat exchanger
49 Second conveying device
50 Fifth flow path
60 First component air conditioning unit
61 Flow direction intake air passenger compartment first component 60
62, 62a, 62b Second component air conditioning unit
62b-1 First element second component air conditioning unit 62b
62b-2 Second element second component air conditioning unit 62b
63, 63a Flow direction intake air passenger compartment second component 62
63b-1, 63b-2 Flow direction intake air passenger compartment second component
64 Housing first component 60
65 Air guide device heat exchanger 33
66a, 66b-1, 66b-2 Housing second component 62
67 Air guide device heat exchanger 34
68 Air guide device
69a, 69b-1, 69b-2 Flow direction intake air second component air conditioning unit 62
70a, 70b Air guide device
71a, 71b Flow direction cold air

The invention claimed is:

1. An air conditioning system of a motor vehicle, the air conditioning system comprising:
a refrigeration circuit; and
a coolant circuit, wherein the refrigeration circuit further comprises:
 a compressor;
 a refrigerant-coolant heat exchanger which can be operated as a condenser/gas cooler for heat exchange between a refrigerant and a coolant of the coolant circuit;
 a first refrigerant-air heat exchanger for conditioning intake air for a passenger compartment; and
 a first expansion device located upstream with respect to the first refrigerant-air heat exchanger in a flow direction of the refrigerant;
wherein the coolant circuit further comprises:
 a first conveying device;
 a first coolant-air heat exchanger for heating the intake air for the passenger compartment as well as the refrigerant-coolant heat exchanger
wherein the refrigeration circuit includes a second refrigerant-air heat exchanger for conditioning the intake air for the passenger compartment,
and wherein a second expansion device is located upstream with respect to the second refrigerant-air heat exchanger in the flow direction of the refrigerant, and the coolant circuit includes a second coolant-air heat exchanger for heating the intake air for the passenger compartment, wherein the first expansion device and the first refrigerant-air heat exchanger are arranged within a first flow path of the refrigeration circuit, wherein the second expansion device and the second refrigerant-air heat exchanger are arranged within a second flow path of the refrigeration circuit, and wherein the first flow path and the second flow path are arranged to enable throughflow parallel to one another, wherein the first flow path with the first expansion device and with the first refrigerant-air heat exchanger and the second flow path with the second expansion device and with the second refrigerant-air heat exchanger are each formed to extend from a branch point to a first opening point, and wherein an expansion device is formed downstream with respect to the first opening point in the flow direction of the refrigerant or in each case an expansion device is formed downstream with respect to the first refrigerant-air heat exchanger within the first flow path and with respect to the second refrigerant-air heat exchanger within the second flow path in the flow direction of the refrigerant.

2. The air conditioning system according to claim 1, wherein the first refrigerant-air heat exchanger of the refrigeration circuit and the first coolant-air heat exchanger of the coolant circuit are arranged within a first component of an air conditioning unit and in a manner so that the first refrigerant-air heat exchanger of the refrigeration circuit and the first coolant-air heat exchanger can be supplied in series, in a flow direction of the intake air for the passenger compartment, and wherein the second refrigerant-air heat exchanger of the refrigeration circuit and the second coolant-air heat exchanger of the coolant circuit are arranged within a second component of the air conditioning unit.

3. The air conditioning system according to claim 2, wherein the first component of the air conditioning unit is configured so air discharged from the passenger compartment or environmental air or a mixture of the air discharged from the passenger compartment and the environmental air can flow through the first component.

4. The air conditioning system according to claim 2, wherein the second component of the air conditioning unit is configured so air discharged from the passenger compartment can flow through the second component, wherein the air can be discharged into the passenger compartment and/or into the environment.

5. An air conditioning system of a motor vehicle, the air conditioning system comprising:
a refrigeration circuit; and
a coolant circuit, wherein the refrigeration circuit further comprises:
 a compressor;
 a refrigerant-coolant heat exchanger which can be operated as a condenser/gas cooler for heat exchange between a refrigerant and a coolant of the coolant circuit;
 a first refrigerant-air heat exchanger for conditioning intake air for a passenger compartment; and
 a first expansion device located upstream with respect to the first refrigerant-air heat exchanger in a flow direction of the refrigerant;
wherein the coolant circuit further comprises:
 a first conveying device;
 a first coolant-air heat exchanger for heating the intake air for the passenger compartment as well as the refrigerant-coolant heat exchanger
wherein the refrigeration circuit includes a second refrigerant-air heat exchanger for conditioning the intake air for the passenger compartment,
wherein a second expansion device is located upstream with respect to the second refrigerant-air heat exchanger in the flow direction of the refrigerant, and the coolant circuit includes a second coolant-air heat exchanger for heating the intake air for the passenger compartment, wherein the first refrigerant-air heat exchanger of the refrigeration circuit and the first coolant-air heat exchanger of the coolant circuit are arranged within a first component of an air conditioning unit and in a manner so that the first refrigerant-air heat exchanger of the refrigeration circuit and the first coolant-air heat exchanger can be supplied in series, in a flow direction of the intake air for the passenger compartment, wherein the second refrigerant-air heat exchanger of the refrigeration circuit and the second coolant-air heat exchanger of the coolant circuit are arranged within a second component of the air conditioning unit, wherein the second refrigerant-air heat exchanger of the refrigeration circuit and the second coolant-air heat exchanger of the coolant circuit are arranged within the second component of the air conditioning unit so the second refrigerant-air heat exchanger of the refrigeration circuit and the second coolant-air heat exchanger of the coolant circuit can be supplied with air in series, in a flow direction, wherein the second component further comprises a bypass for guiding air around the refrigerant-air heat exchanger, and wherein an air guide device is formed for distributing an air mass stream over a heat exchange surface of the second refrigerant-air heat exchanger and through the bypass.

6. An air conditioning system of a motor vehicle, the air conditioning system comprising:
a refrigeration circuit; and
a coolant circuit, wherein the refrigeration circuit further comprises:
 a compressor;
 a refrigerant-coolant heat exchanger which can be operated as a condenser/gas cooler for heat exchange between a refrigerant and a coolant of the coolant circuit;
 a first refrigerant-air heat exchanger for conditioning intake air for a passenger compartment; and
 a first expansion device located upstream with respect to the first refrigerant-air heat exchanger in a flow direction of the refrigerant;
wherein the coolant circuit further comprises:
 a first conveying device;
 a first coolant-air heat exchanger for heating the intake air for the passenger compartment as well as the refrigerant-coolant heat exchanger
wherein the refrigeration circuit includes a second refrigerant-air heat exchanger for conditioning the intake air for the passenger compartment,
wherein a second expansion device is located upstream with respect to the second refrigerant-air heat exchanger in the flow direction of the refrigerant, and the coolant circuit includes a second coolant-air heat exchanger for heating the intake air for the passenger compartment,
wherein the first refrigerant-air heat exchanger of the refrigeration circuit and the first coolant-air heat exchanger of the coolant circuit are arranged within a first component of an air conditioning unit and in a manner so that the first refrigerant-air heat exchanger of the refrigeration circuit and the first coolant-air heat exchanger can be supplied in series, in a flow direction of the intake air for the passenger compartment, and
wherein the second refrigerant-air heat exchanger of the refrigeration circuit and the second coolant-air heat exchanger of the coolant circuit are arranged within a second component of the air conditioning unit,
wherein the second component of the air conditioning unit is formed from a first element and a separately arranged second element, and wherein the second coolant-air heat exchanger of the coolant circuit is arranged within the first element of the second component, and the second refrigerant-air heat exchanger of the refrigeration circuit is arranged within the second element of the second component.

7. The air conditioning system according to claim 2, wherein the second component further comprises an opening formed in a wall of a housing for discharging air into the environment and an air guide device for opening and closing the opening, wherein the opening is formed downstream with respect to the second refrigerant-air heat exchanger in a flow direction of the air.

8. The air conditioning system according to claim 1, wherein the refrigeration circuit further comprises a third flow path with a third expansion device and a heat exchanger operable as an evaporator, wherein the third expansion device is located upstream with respect to the heat exchanger in the flow direction of the refrigerant, and wherein the third flow path is formed parallel to the first flow path and to the second flow path.

9. The air conditioning system according to claim 1, wherein the third flow path with the third expansion device and with the heat exchanger extends from the branch point to a second opening point, wherein the second opening point is formed downstream with respect to the first opening point in the flow direction of the refrigerant through the first flow path and through the second flow path.

10. The air conditioning system according to claim 9, wherein the refrigeration circuit further comprises an inner heat exchanger, wherein the inner heat exchanger is arranged on a high-pressure side between the refrigerant-coolant heat exchanger and the branch point of the first flow path and the second flow path and on a low-pressure side between the second opening point and the compressor or between the first opening point and the second opening point.

11. The air conditioning system according to claim 1, wherein the refrigeration circuit further comprises an inner heat exchanger formed within the first flow path, and wherein the inner heat exchanger is arranged in the flow direction of the refrigerant on a high-pressure side before the first expansion device and on a low-pressure side after the first refrigerant-air heat exchanger.

12. The air conditioning system according to claim 1, wherein the first coolant-air heat exchanger is arranged within a first flow path of the coolant circuit and the second coolant-air heat exchanger is arranged within a second flow path of the coolant circuit, and wherein the first flow path and the second flow path and the first coolant-air heat exchanger and the second coolant-air heat exchanger are arranged to enable throughflow parallel to one another, or the first coolant-air heat exchanger and the second coolant-air heat exchanger are arranged within a common flow path of the coolant circuit so the first coolant-air heat exchanger and the second coolant-air heat exchanger are capable of throughflow in series.

13. The air conditioning system according to claim 1, wherein the coolant circuit is formed with a third coolant-air heat exchanger for transferring heat to air.

14. The air conditioning system according to claim 13, wherein the third coolant-air heat exchanger is arranged within a flow path of the coolant circuit which is arranged to enable throughflow of the coolant parallel to a flow path formed with the first coolant-air heat exchanger and/or a flow path formed with the second coolant-air heat exchanger.

15. An air conditioning system of a motor vehicle, the air conditioning system comprising:
a refrigeration circuit; and
a coolant circuit, wherein the refrigeration circuit further comprises:
a compressor;
a refrigerant-coolant heat exchanger which can be operated as a condenser/gas cooler for heat exchange between a refrigerant and a coolant of the coolant circuit;
a first refrigerant-air heat exchanger for conditioning intake air for a passenger compartment; and
a first expansion device located upstream with respect to the first refrigerant-air heat exchanger in a flow direction of the refrigerant;
wherein the coolant circuit further comprises:
a first conveying device;
a first coolant-air heat exchanger for heating the intake air for the passenger compartment as well as the refrigerant-coolant heat exchanger
wherein the refrigeration circuit includes a second refrigerant-air heat exchanger for conditioning the intake air for the passenger compartment,
wherein a second expansion device is located upstream with respect to the second refrigerant-air heat exchanger in the flow direction of the refrigerant, and the coolant circuit includes a second coolant-air heat exchanger for heating the intake air for the passenger compartment,
wherein the coolant circuit is formed with a third coolant-air heat exchanger for transferring heat to air,
wherein the third coolant-air heat exchanger is arranged within a flow path of the coolant circuit which is arranged to enable throughflow of the coolant parallel to a flow path formed with the first coolant-air heat exchanger and/or a flow path formed with the second coolant-air heat exchanger, and
wherein the coolant circuit further comprises a first flow path configured as a bypass parallel to the flow path of the first coolant-air heat exchanger, the flow path of the second coolant-air heat exchanger, and a flow path of the third coolant-air heat exchanger.

16. The air conditioning system according to claim 15, wherein the coolant circuit further comprises a second flow path formed parallel to the flow path with the first coolant-air heat exchanger, the flow path of the second coolant-air heat exchanger, and a flow path of the third coolant-air heat exchanger and/or parallel to the first flow path formed as bypass, wherein the second flow path is formed with a heat exchanger operable as an evaporator and with a second conveying device.

17. The air conditioning system according to claim 16, wherein the heat exchanger of the second flow path is formed as a refrigerant-coolant heat exchanger.

18. A method for operating the air conditioning system of the motor vehicle with the refrigeration circuit and with the coolant circuit for operating in a refrigeration mode, in a heat pump mode, and in a reheating mode for the intake air to be conditioned for the passenger compartment, according to claim 17, wherein pressure levels of the refrigerant are set in such a manner that a pressure level within the first refrigerant-air heat exchanger for conditioning the intake air for the passenger compartment and a pressure level within a second refrigerant-air heat exchanger for conditioning the intake air for the passenger compartment correspond to one another or differ from one another, and wherein at least one pressure level within the first refrigerant-air heat exchanger and/or within the second refrigerant-air heat exchanger corresponds to a pressure level within the heat exchanger of the second flow path operable as an evaporator or is higher than the pressure level within the heat exchanger of the second flow path operable as an evaporator.

19. The method for operating an air conditioning system according to claim 18, wherein the refrigerant flows through the first refrigerant-air heat exchanger and the second refrigerant-air heat exchanger parallel to one another.

20. The method for operating an air conditioning system according to claim 19, wherein the refrigerant flows through the first coolant-air heat exchanger and the second coolant-air heat exchanger parallel to one another or in series.

21. The method for operating an air conditioning system according to claim 20, wherein in a flow direction of the air, the second refrigerant-air heat exchanger and subsequently the second coolant-air heat exchanger are supplied with the air, wherein in each case at least one partial air mass stream is run over a heat exchange surface of the second refrigerant-air heat exchanger and over a heat exchange surface of the second coolant-air heat exchanger and/or at least one partial air mass stream of an air mass stream which is run over a heat exchange surface of the second refrigerant-air heat exchanger or past the second refrigerant-air heat exchanger is diverted into the environment.

* * * * *